United States Patent
Irish et al.

(10) Patent No.: US 8,473,194 B2
(45) Date of Patent: Jun. 25, 2013

(54) SYSTEM AND METHOD FOR CONDUCTING A LOCATION BASED SEARCH

(75) Inventors: Jeremy A. Irish, Seattle, WA (US);
Elias C. Alvord, Seattle, WA (US)

(73) Assignee: Groundspeak, Inc., Seattle, WA (US)

( * ) Notice: Subject to any disclaimer, the term of this patent is extended or adjusted under 35 U.S.C. 154(b) by 864 days.

(21) Appl. No.: 12/319,119

(22) Filed: Dec. 31, 2008

(65) Prior Publication Data
US 2009/0177486 A1    Jul. 9, 2009

Related U.S. Application Data

(60) Provisional application No. 61/010,021, filed on Jan. 3, 2008, provisional application No. 61/010,036, filed on Jan. 3, 2008, provisional application No. 61/010,023, filed on Jan. 3, 2008.

(51) Int. Cl.
*G06F 19/00* (2011.01)
*G01C 21/00* (2006.01)

(52) U.S. Cl.
USPC ........... 701/409; 701/426; 701/428; 701/430; 701/431; 340/309.8; 340/323 R; 702/150; 342/357.22; 273/461

(58) Field of Classification Search
USPC .................. 701/209, 200, 213, 207, 208, 201, 701/400, 408, 409, 410, 432, 425, 426, 428, 701/430, 431; 340/995.24, 995, 988, 323 R, 340/500, 286.02, 309.16, 309.8; 342/357.08, 342/357.2, 357.21, 357.22; 705/1, 5; 702/150; 273/461; 473/131, 407
See application file for complete search history.

(56) References Cited

U.S. PATENT DOCUMENTS

| | | | |
|---|---|---|---|
| 5,923,100 A | 7/1999 | Lukens et al. | |
| 5,933,100 A | 8/1999 | Golding | |
| 5,938,721 A | 8/1999 | Dussell et al. | |
| 6,266,612 B1 | 7/2001 | Dussell et al. | |
| 6,313,835 B1 | 11/2001 | Gever et al. | |
| 6,320,495 B1 | 11/2001 | Sprogis | |
| 6,411,899 B2 | 6/2002 | Dussell et al. | |
| 7,356,405 B1 * | 4/2008 | Nesbit | 701/202 |
| 2003/0036428 A1 | 2/2003 | Aasland | |
| 2004/0002843 A1 | 1/2004 | Robarts et al. | |
| 2006/0167784 A1 | 7/2006 | Hoffberg | |
| 2006/0229807 A1 * | 10/2006 | Sheha et al. | 701/209 |
| 2006/0230337 A1 | 10/2006 | Lamont et al. | |
| 2008/0262714 A1 * | 10/2008 | Abramovich Ettinger | 701/201 |

* cited by examiner

*Primary Examiner* — Ronnie Mancho
(74) *Attorney, Agent, or Firm* — Patrick J.S. Inouye; Krista A. Wittman

(57) ABSTRACT

A system and method for conducting a location based search for event cartridges is provided. A database of cartridges is maintained. Each cartridge includes a sequence of triggerable events and origin geolocational data for a start location for execution of the triggerable events. A server is operatively coupled to the database and interfaces to a user device having a display and user input controls. A user request from the user device is processed. The user request, including a location of the user device, is received. The cartridges are searched by comparing the location of the user device and the start location for each cartridge. Those cartridges with the start location proximate to the location of the user device are selected. The selected cartridges are provided to the user device as a menu on the display and are further selectable through the user input controls.

22 Claims, 33 Drawing Sheets

31

33

30

32

36

34

35

180

230

390

SYSTEM AND METHOD FOR CONDUCTING A LOCATION BASED SEARCH

CROSS-REFERENCE TO RELATED APPLICATION

This non-provisional patent application claims priority under 35 U.S.C. §119(e) to U.S. Provisional Patent application Ser. No. 61/010,021, filed Jan. 3, 2008, U.S. Provisional Patent application Ser. No. 61/010,036, filed Jan. 3, 2008, and U.S. Provisional Patent application Ser. No. 61/010,023, filed Jan. 3, 2008, the priority filing dates of which are claimed, and the disclosures of which are incorporated by reference.

COPYRIGHT NOTICE

A portion of the disclosure of this patent document contains material subject to copyright protection. The copyright owner has no objection to the facsimile reproduction by anyone of the patent document or the patent disclosure as appearing in the Patent and Trademark Office patent file or records, but otherwise reserves all copyright rights whatsoever.

FIELD

The present invention relates in general to conducting searches and, in particular, to a system and method for conducting a location based search.

BACKGROUND

The Global Positioning System (GPS) is a satellite navigation system consisting of 24 satellites that orbit the Earth every 12 hours. GPS signals received from the satellites are processed by GPS receivers to determine location in latitude and longitude. Non-military GPS receivers are capable of determining a location with a six-meter range of accuracy.

GPS receivers are passive devices that provide relative locational data only. The locational data must be combined with maps, charts and other navigational aids to bring meaning to the latitude and longitude coordinates. Thus, GPS navigation information is most useful when used in combination with preferably automated and wireless technologies.

Accordingly, many portable and wireless computational devices, such as cellular telephones, personal data assistants, pagers and wireless electronic mail (email) clients incorporate GPS receivers, to enhance and complement the locational information provided. For instance, personal data assistants having integrated GPS receivers can provide navigational information through a portable database storing points of interest. Moreover, the processing capabilities of many of these portable devices support downloadable cartridges for utilizing the GPS receiver-provided information for customized applications.

One popular use of GPS information is a modified version of a treasure hunting game, known as geocaching. During a geocaching game, users equipped with a GPS receiver navigate from point to point using latitude and longitude values obtained by correctly solving clues received throughout the hunt. Players proceed from a starting point until the cache, that is, treasure, is found. Variations of geocaching include incorporating wireless computing technology to enable interactions directly between competing players and managed gameplay, where each player is tracked and the clues are customized based on individual progress. Other uses of GPS information are known in the art.

U.S. Pat. No. 6,320,495 discloses a treasure hunting game utilizing GPS-equipped wireless computing devices. Players are given clues or directions to proceed along one of several predetermined treasure hunting routes based on their location, as determined by a GPS receiver. Each player's position, along with the treasure hunt route, is calculated by the GPS receiver and transmitted to a software program by a wireless computing device. The first player to arrive at the treasure wins the game. However, the clues or messages provided to each player must be first determined by a centralized software program and are not dynamically triggered based on user-definable conditions.

U.S. Pat. No. 5,923,100 discloses an automobile navigation system utilizing GPS geolocational data. The vehicle location and travel time are transmitted to a central database via a wireless computing device and used to plan travel times and determine optimal travel routes. As necessary, the route is revised to adjust for deviations in travel direction and time. However, user-definable events cannot be programmed into the route planning process.

Prior art non-GPS based informational systems include infrared portable narrators. These devices store a recorded script associated with points of interest within an attraction, such as an art museum or zoo. The narrators receive infrared input signals from static display positions along the route, which trigger the playback of the narration associated with the display. However, these devices are passive and user-definable events cannot be programmed into the recorded script.

Prior art non-GPS based informational systems also include wireless messaging systems, such as the Cooltown technology disclosed in http://www.internex.org/hp_world-_news/hpw203/03newshtml, the disclosure of which is incorporated by reference. Mid-air messages are provided by combining GPS technology with infrared or Bluetooth-capable wireless devices. An information broadcast is triggered whenever a user enters a geographically described location. However, the Cooltown technology operates only within discrete areas and user-definable events cannot be programmed into the mid-air messaging system.

Therefore, there is a need for an approach to generating user-definable events triggered through geolocational data describing zones of influence, as well as temporal and independent conditions.

There is a further need for a framework for building user-definable events triggerable through geolocational data describing zones of influence as well as temporal and independent conditions.

There is a further need for an approach to defining locational, temporal and independent event triggers used in a combination of GPS and wireless computational technologies.

There is a further need for an approach to accessing cartridges of user-definable events that are specific to a particular type of wireless computing device.

SUMMARY

The present invention provides a system and method for producing and processing zones of influence described through locational, temporal and independent conditions. Preferably, the user is equipped with a wireless computing device having a GPS receiver and timer. A plurality of zones of influence is defined through geolocational data, preferably expressed in latitude and longitude. User-definable events are associated with the zones of influence. The events are triggered as a user transitions between, within and around the zones of influence. Timed events relative to an initial starting time and independent events can also be defined. The timed and independent events are triggered as the time limits expire and independent conditions are met.

An embodiment provides a system and method for conducting a location based search for event cartridges. A database of cartridges is maintained. Each cartridge includes a sequence of triggerable events and geolocational data for a beginning location for execution of the sequence of events associated with that cartridge. A server is operatively coupled to the database and interfaces to a user device having a display and user input controls. A user request from the user device is processed. The user request, including a location of the user device is received. The cartridges are searched by comparing the location of the user device and the beginning location for the sequence of events associated with each cartridge. Those cartridges with the beginning location proximate to the location of the user device are selected. The selected cartridges are provided to the user device as a menu on the display and are further selectable through the user input controls.

Still other embodiments of the present invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Glossary

Cartridge: A cartridge is a file that includes a collection of zones, items, events, and non-player characters, which create a user experience in the physical world using geolocational data.

Item: An item is a virtual or physical object that can be manipulated through cartridge events, player characters, or non-player characters.

Player A player character is a human player who interacts with

Character: the physical or virtual world independent of the system programming.

Non-Player A non-player character is a computer-generated entity
Character: with whom the player character can interact. Interaction occurs programmatically through query and response behaviors.
Events: Events are triggers which occur programmatically within a cartridge. There are four types of events:
  (1) Recurring Events: Time-based events which reoccur at certain intervals, for example, a timer that announces the score every 15 minutes or a random movement of an non-player character.
  (2) Triggered Events: Time-based events which occur after a certain amount of time has passed, for example, a clock that chimes every hour and half-hour. Alternatively, events which occur at an exact time, for example, at 4:00 pm, a door opens, then closes again at 4:15 pm.
  (3) Conditional Triggered Events: Time-based events which occur when certain conditions exist at certain time intervals or exact times, for example, if a zone has been entered and the player character has x item, the door will open at 4:00 pm.
  (4) Non-Timed Events: Non-time-based-events which occur based on locational or independent conditions. Locational conditions are met when a player character enters, exits or is proximate to a zone of influence, player character, non-player character, or object. An independent condition is met when a user-initiated, player character, or non-player character, action occurs.

The foregoing terms are used throughout this document and, unless indicated otherwise, are assigned the meanings presented above.

Figure 1A:
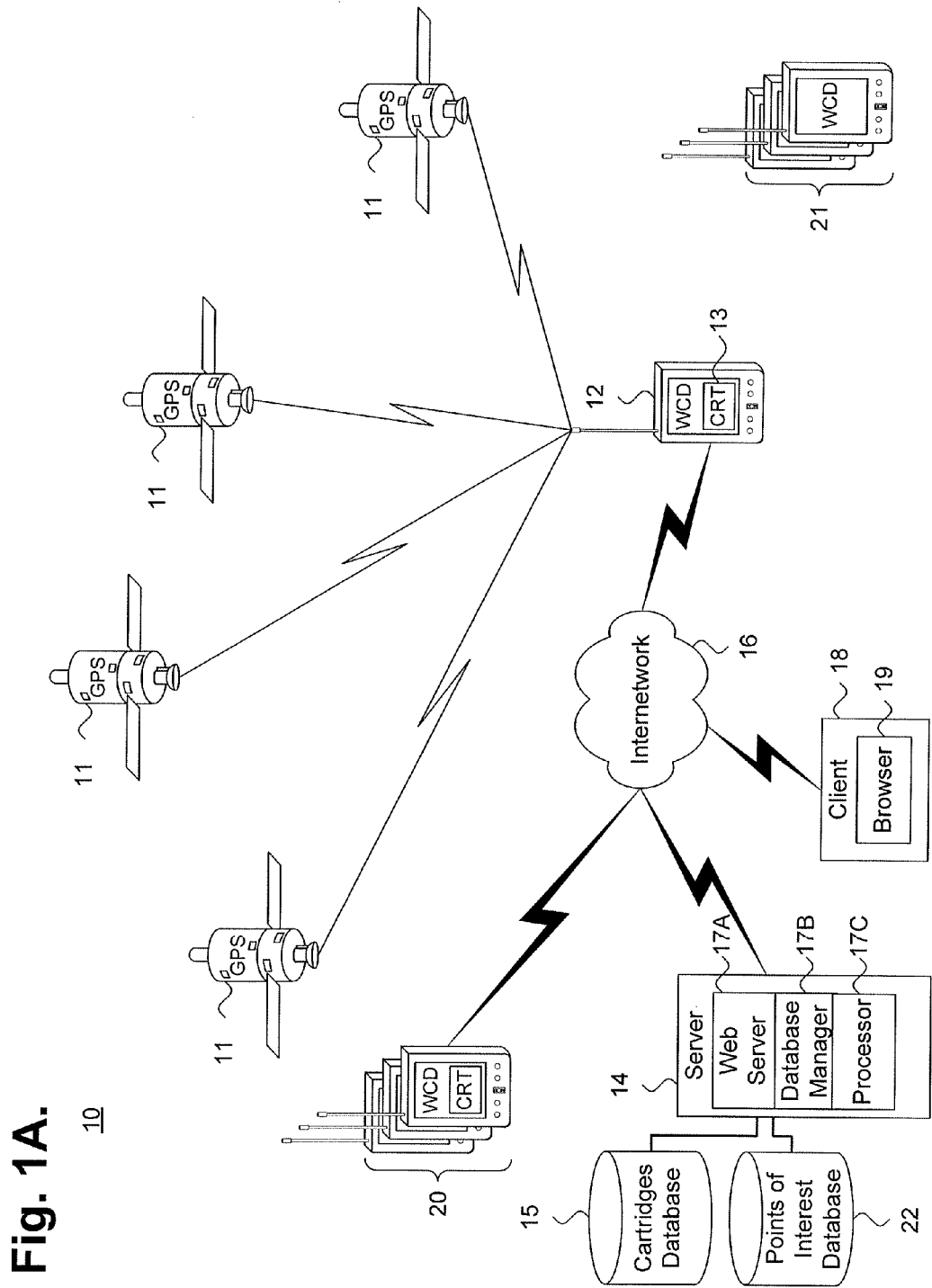
FIG. 1A is a block diagram showing a system for executing user events triggered through geolocational data describing zones of influence, in accordance with the present invention.

FIG. 1A is a block diagram showing a system 10 for executing user events triggered through geolocational data describing zones of influence, in accordance with the present invention. The system 10 operates in accordance with a sequence of process steps, as further described below with reference to FIG. 10.

A constellation of global positioning system (GPS) satellites 11 provides geolocational data to a wireless computing device (WCD) 12. GPS satellites 11 transmit geolocational data, including latitude, longitude, altitude, and precision. The wireless computing device 12, incorporating a GPS receiver, receives GPS signals from the GPS satellites 11 and processes the GPS signals to determine the location of the wireless computing device 12. In addition, the wireless computing device 12 executes a cartridge (CRT) 13 to trigger user events when the location of the wireless computing device correlates to geolocational data describing one or more zones of influence, as further described below beginning with reference to FIGS. 2A and 2B.

Although a wireless computing device 12 is shown, other forms and arrangements of devices could be used. At a minimum, the device must be capable of executing a cartridge 13, of determining a location from geolocational data, minimally consisting of latitude and longitude, and of providing some form of output responsive to a triggered event. Processing devices capable of executing a cartridge 13 include a personal or laptop computer, either a wireless or standard personal data assistant, a programmable cellular telephone, a programmable pager, a wireless email client, a two-way radio, and a dedicated processing device. Locational devices capable of determining a location from geolocational data include a standalone GPS receiver attached via a conventional cable, GPS receiver components incorporated into a processing device, such as a wireless personal data assistance with internal GPS receiver, and receiver for receiving signals from a stationary GPS beacon, as described below with reference to FIG. 1B. Output devices include any of the processing devices, as well as augmented reality devices working in conjunction with or as an alternative to the processing devices to provide an output platform for presenting triggered events. Augmented reality devices include "Heads Up" Displays (HUDs), virtual reality eyewear, gloves, earphones and goggles, and any other form of display device, as is known in the art. Accordingly, the term wireless computing device 12 will apply broadly to any arrangement, configuration or combination of processing, locational and output devices having the aforementioned capabilities and which could be used interchangeably herein, as would be recognized by one skilled in the art.

The wireless computing device 12 downloads the cartridge 13 from a centralized server 14 via an internetwork 16, such as the Internet, or similar means for interconnecting computational devices. The centralized server 14 includes a Web server 17A and database manager 17B. The Web server 17A serves Web content to the wireless computing device 12 to facilitate the retrieval of the cartridge 13 from a cartridges database 15 coupled to the centralized server 14. The centralized server 14 also includes a database manager 17B that accesses the cartridges database 15 to retrieve the requested cartridge 13. A client 18 interconnected to the centralized server 14 via the internetwork 16 executes a Web browser 19 to display Web content received from the centralized server 14. The client 18 can be used to organize the cartridges database 15 and to build new cartridges for use in a wireless computing device 12, as further described below with reference to FIG. 8.

A sequence of events is stored in the cartridge 13. Events can be logically linked to one or more zones of influence, which logically define an enclosed space through which the user progresses, or can be defined as global or "world" event, independent of any zone of influence. The events are triggered based on locational, temporal, and independent conditions. In the described embodiment, a plurality of zones of influence are described using geolocational data to define a logically enclosed space. Each non-time-based and non-global event is triggered as the wireless computing device 12 progresses through the associated zones of influence. The operator of the wireless computing device 12, referred as a player character, receives a dialog in the form of an interactive, story-like experience throughout the event sequence via the wireless computing device 12. In a further embodiment, the player character competes against other player characters also having wireless computing devices 20. Additionally, the actions of other non-player characters having wireless computing devices 21 can also factor into the progress of the event sequence.

Optionally, the wireless computing device 12 can also download information from a points of interest database 22 from the centralized server 14. The points of interest database 22 includes general and specialized information, which can be retrieved via the wireless computing device 12 in an interactive session. The points of interest information includes thematic data, such as bird watching sites, sushi restaurants and sponsor locations. The wireless computing device 12 can determine and provide directions to individual points of interest through server-provided geolocational data.

The individual computer systems, including server 14 and client 18, include general purpose, programmed digital computing devices consisting of a central processing unit (CPU) 17C, random access memory (RAM), non-volatile secondary storage, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage.

Figure 1B:
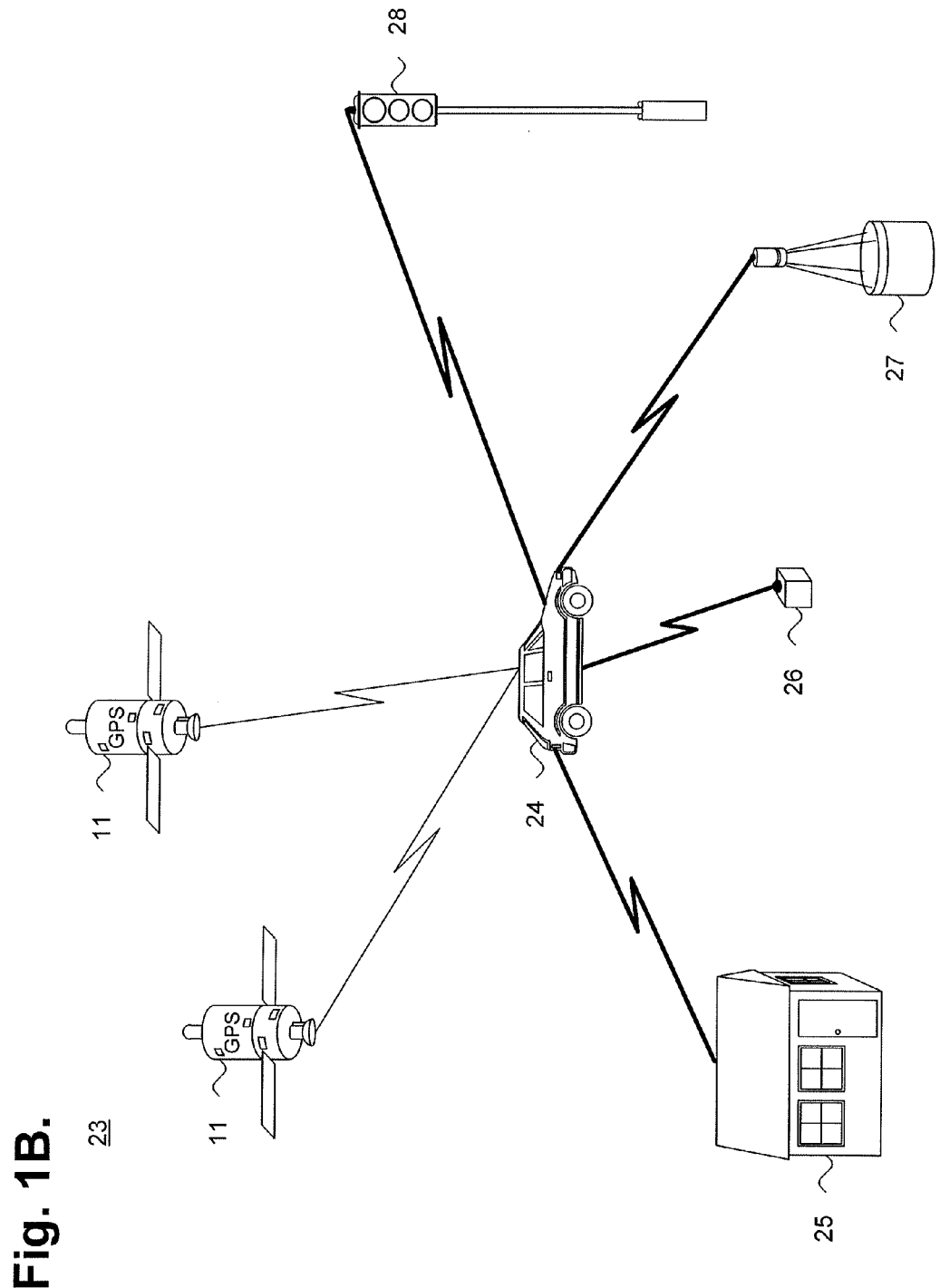
FIG. 1B is a block diagram showing a further embodiment of the system of FIG. 1A.

FIG. 1B is a block diagram showing a further embodiment 23 of the system 10 of FIG. 1A. Ordinarily, GPS signals can only be received out-of-doors by a GPS-capable receiver. In the further embodiment 23, stationary GPS beacons transmit static geolocational and informational data on a substantially continuous basis to provide conventional GPS signals indoors and in areas without GPS coverage. The geolocational data identifies the locations of stationary and non-stationary objects. Each beacon includes a short-range transmitter capable of providing GPS-equivalent signals whenever a GPS receiver cannot receive regular GPS signals and is proximate to the beacon.

For instance, a vehicle 24 equipped with a GPS receiver will ordinarily only receive GPS signals from the constellation of GPS satellites 11. However, GPS short-range beacons can be located in a building 25, at a landmark 26, on a marine buoy 27, and on a traffic signal 28, for example, and in other stationary or non-stationary objects to provide static geolocational data, each short-range beacon continually transmits geolocational data. In addition, the short-range beacons can transmit informational messages, which can be used in conjunction with an event sequence.

In the described embodiment, each short-range beacon 25-28 operates as a low-powered radio frequency transmitter, such as provided in accordance with IEEE 802.11b, "Bluetooth" or similar wireless protocols. The short-range beacons can be portable or mounted on a stationary object and transmit standard GPS geolocational data, including latitude, longitude, altitude, date and time, identification, and, optionally, executable program code. Other arrangements of GPS and short-range transmission components are feasible, as would be recognized by one skilled in the art.

Alternatively, each short-range beacon 25-28 transmits non-standard GPS geolocational data, in accordance with a wireless protocol, such as the Short Message Service (SMS). A psuedo-GPS receiver is provided communicatively interposed between the GPS receiver circuitry and the general purpose processor. The psuedo-GPS receiver translates packets received from the short-range beacon in a non-GPS compatible format and extracts and forwards the GPS signals received from the beacon. Pseudo-GPS receivers allow backward compatibility with devices limited to receiving GPS signals only.

Figure 2B:
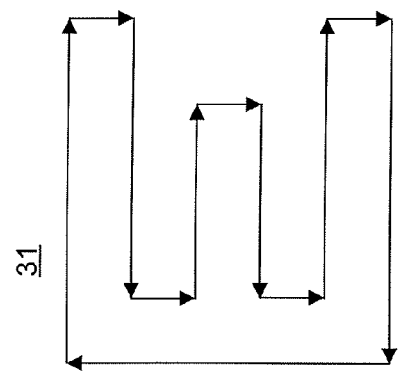
FIGS. 2A and 2B are template drawings showing, by way of example, arbitrary two-dimensional vector-based zones of influence.
Figure 2A:
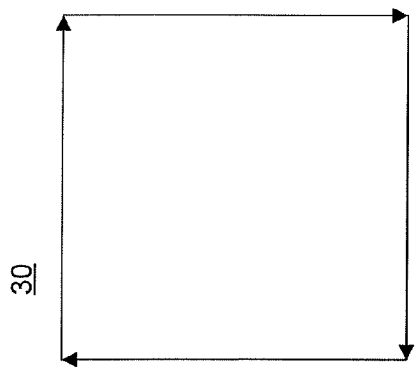

FIGS. 2A and 2B are template drawings showing, by way of example, arbitrary two-dimensional vector-based zones of influence. Vector-based zones of influence are definable by specifying a starting point, vector angle, and distance. Referring first to FIG. 2A, a square zone of influence 30 is logically defined by a set of four straight line vectors. Referring next to FIG. 2B, a zone of influence 31 roughly shaped as the letter 'E' is logically defined by a set of twelve straight line vectors. Other analogous forms of defining vector-based zones of influence, such as through polar or Cartesian coordinates, are possible, as would be recognized by one skilled in the art.

Figure 3B:
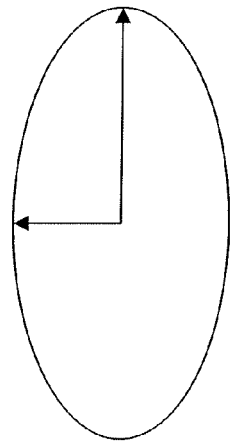
FIGS. 3A and 3B are template drawings showing, by way of example, arbitrary two-dimensional point-radius zones of influence.
Figure 3A:
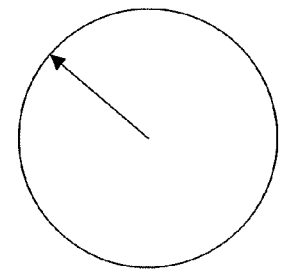

FIGS. 3A and 3B are template drawings showing, by way of example, arbitrary two-dimensional point-radius zones of influence. Point-radius zones of influence are definable by specifying one or more centers or foci and associated radii. Referring first to FIG. 3A, a circular zone of influence 32 is formed by specifying a radius projected from a center. Referring next to FIG. 3B, an elliptical zone of influence 33 is formed specifying major and minor axes projected from a center. Alternatively, the elliptical zone of influence 33 could be specified by a pair of foci (not shown). Other forms of point-radius zones of influence are possible, as would be recognized by one skilled in the art.

Figure 4:
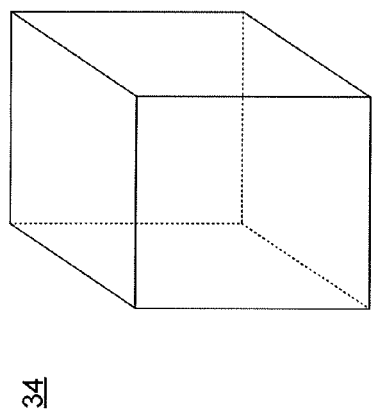
FIG. 4 is a template drawing showing, by way of example, an arbitrary three-dimensional vector-based zone of influence.

FIG. 4 is a template drawing showing, by way of example, an arbitrary three-dimensional vector-based zones of influence. Three-dimensional vector-based zones of influence are definable by specifying a starting point, vector angle, distance, and height. A cubical zone of influence 34 is defined by a set of 12 individual vectors formed into a cube. Other forms of three-dimensional vector-based zones of influence are possible, as would be recognized by one skilled in the art.

Figure 5B:
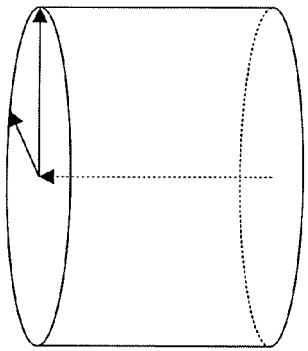
FIGS. 5A and 5B are template drawings showing, by way of example, arbitrary three-dimensional point-radius zones of influence.
Figure 5A:
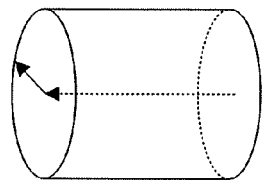

FIGS. 5A and 5B are template drawings showing, by way of example, arbitrary three-dimensional point-radius zones of influence. Three-dimensional point-radius zones of influence are definable by specifying one or more foci and associated radii and a height. Referring first to FIG. 5A, a cylindrical zone of influence 35 is defined by a two-dimensional circular zone of influence specified with a height. Referring next to FIG. 5B, an elliptical cylindrical zone of influence 36 is defined by an elliptical zone of influence projected with a given height. Other forms of three-dimensional radius zones of influence are possible, as would be recognized by one skilled in the art.

Figure 6:
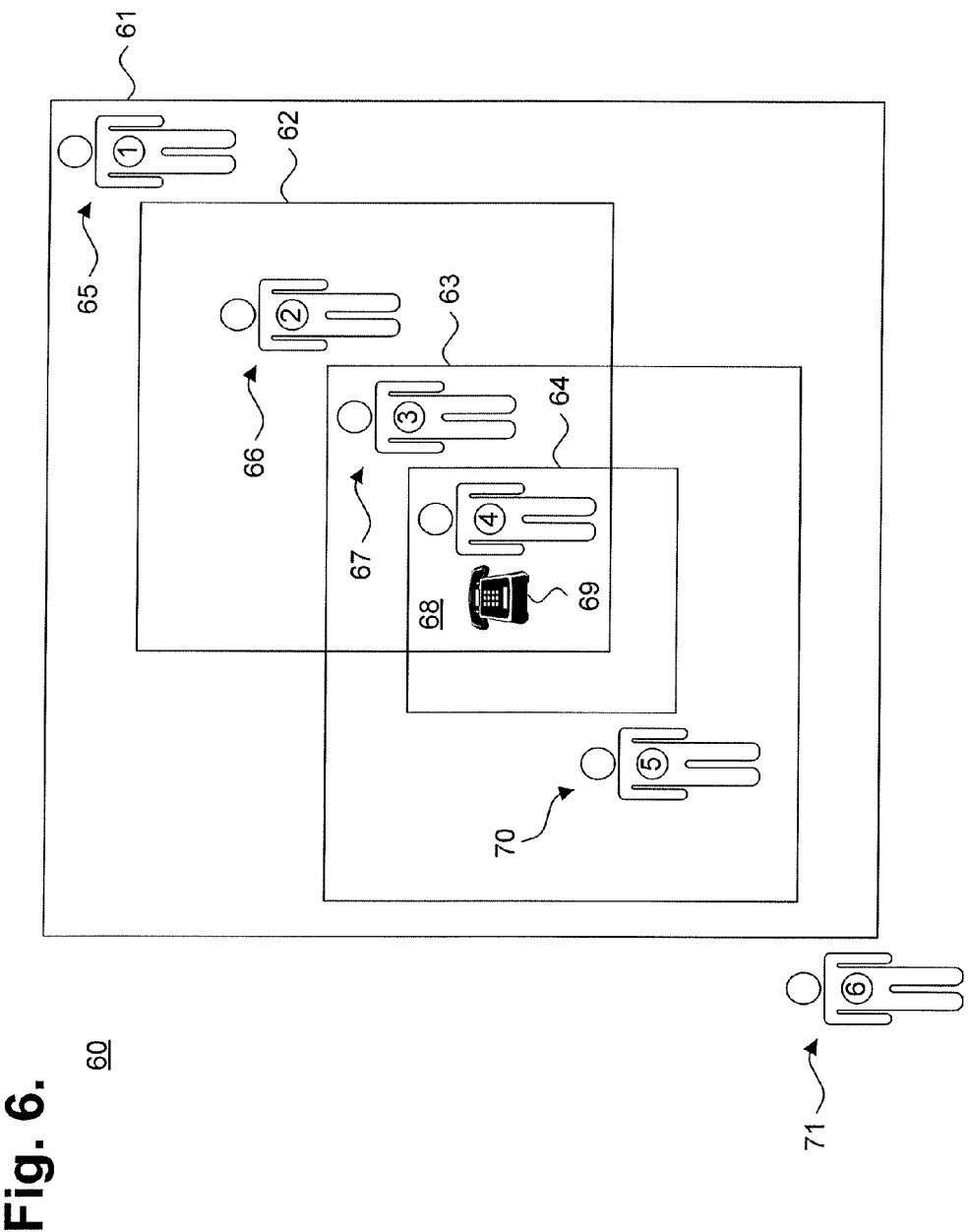
FIG. 6 is a map diagram showing, by way of example, interrelated zones of influence.

FIG. 6 is a map diagram 60 showing, by way of example, interrelated zones of influence 61-64. Each of the zones of influence 61-64 is a vector storing geolocational data, which describe a logically enclosed space. The geolocational data specifies latitude, longitude, altitude, time, date, identification, security code, signal strength, and similar relevant data, as would be recognized by one skilled in the art.

A zone of influence 61-64 can have any shape and size limited, however, by the maximum accuracy of GPS technology. In the described embodiment, an accuracy of six meters is utilized. Individual zones of influence 61-64 can be discrete from each other, overlapping, nested, layered, or adjoining.

As well, any zone of influence can inherit attributes and events from other zones of influence to allow consistency across individual zones of influence. For example, a countdown timer for an activity involving solving a puzzle could be an inherited attribute. Inheritance is available between any zone of influence and does not require a priori relationships, such as parent-child associates. Zones of influence can inherit attributes and events from another zone even when those attributes and events were also inherited. A zone of influence can inherit discrete attributes and events by specifying the identifiers for another zone of influence. Alternatively, a zone of influence can inherit attributes and events from all zones of influence if no identifiers are specified.

Unlike a grid describing geographic location, the zones of influence 61-64 are flexibly defined to accommodate random event sequences, such as might be formed by a story plotline or gameplay, as with geocaching. In contrast, geographically-based grids are strictly adjoining and cannot resolve into arbitrarily defined enclosed spaces or be arranged in overlapping or nested configurations.

The purpose of a zone of influence 61-64 is to logically define an enclosed space used to trigger user events stored in a cartridge 13 on a wireless computing device 12 (shown in FIG. 1). A series of zones of influence 61-64 can be formed together to create a story, dialog, game, or other type of conversation, as expressed though the triggered user events.

Each event can be triggered through locational, temporal or independent conditions. Locational conditions are met when the wireless computing device 12 enters, exits or is proximate to a zone of influence, player character, non-player character, or object. A temporal condition is met when a timer expires relative to a global, zone, non-player character, user, or object condition. An independent condition is met when a user-initiated, player character, or non-player character action occurs. User-initiated actions occur with reference to the world at large, zone of influence, user, player character, non-player character, or object.

By way of example, a player character enters a first zone of influence 61 (step 1). Upon entering the first zone of influence 61, a user event is triggered to play the sound of a low, muffled growl accompanied by the display on the wireless computing device 12 of the text message, "You can hear growling sounds emanating from the southwest." The player character then enters a second zone of influence 62 (step 2). While within the second zone of influence 62, growling sounds continue to play on the wireless computing device 12 and an image of a doorway is flashed to indicate to the player character that a door is nearby. Upon approaching the door, the player character enters a third zone of influence 63 (step 3). A new sound of louder (and more vicious) growling noises is played and a video segment showing scratches appearing on a door is displayed. Next, the player character enters a fourth zone of influence 64 (step 4). The wireless computing device 12 prompts the player character with the query, "Do you wish to open the door?" Upon nearing the door, a further event is triggered, causing a telephone 69 to ring and playback a prerecorded message begging the player character to not open the door. Upon exiting the fourth zone of influence 64, the player character remains within the enclosing third zone of influence 70 (step 5). Depending upon the actions previously taken by the player character, sounds of a fading growl may be played on the wireless computing device 12, accompanied by text explaining that the growling sound is fading away. However, if the door was opened, the player character will have a predetermined time during which to exit the area before a wild animal "eats" the player character. Finally, the player character exits the outermost and first zone of influence 71 (step 6). If the door was opened and the player character escaped within the time allotted, points are awarded. Otherwise, the player character receives no credit for completing the previous sequence.

Figure 7:
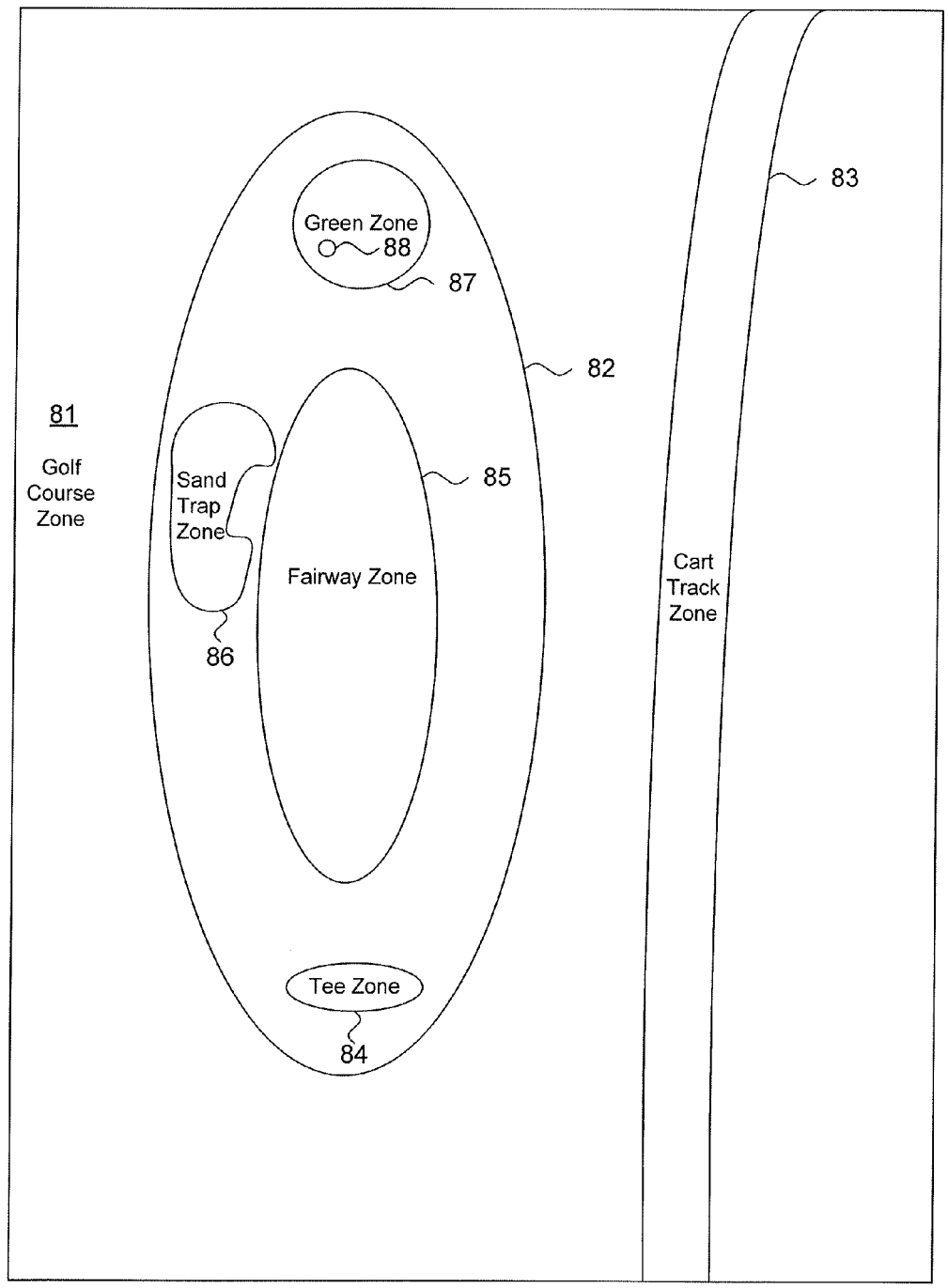
FIG. 7 is a map diagram showing, by way of further example, interrelated zones of influence.

FIG. 7 is a map diagram 80 showing, by way of further example, interrelated zones of influence 81-88. As before, each of the zones of influence 81-88 is described by geolocational data to form a logically enclosed space. In combination with events stored in the cartridge 13 (shown in FIG. 1), the zones of influence 81-88 associate individual event sequences joined by a common theme, such as playing a game of golf.

The zones of influence 81-88 include the golf course zone 81, base zone 82, cart track zone 83, tee zone 84, fairway zone 85, sand trap zone 86, green zone 87, and cup zone 88. The golf course zone 81 provides the general environment in which the event sequence operates. The base zone 86 contains multiple zones, which each inherit properties from the base zone 82. By way of example, the base zone 82 is the 18$^{th}$ Hole in the golf course zone 81. The cart track zone 83 forms a zone of influence separate from the base zone 82. The cart track zone 83 could be used to track the flow of traffic through a golf course by creating an event whenever a specific golf cart enters the cart track zone 83. The event would notify the clubhouse of movement. The tee zone 84 creates an event, "in play," which notifies the clubhouse that a user is teeing off from the 18$^{th}$ Hole. The event also queries the tee zone 84 to see if any other player is in play. If so, the event generates an alert indicating that another player is on the hole and instructing the player to wait until the other player has either moved out of range or completed the hole. The fairway zone 85 updates a location parameter to "on fairway" when the player enters the fairway. In addition, an event is created that presents options on golf clubs to use in relation to the pin and position of the golf ball. The sand trap zone 86 likewise generates an event presenting choices of golf clubs, such as a sand wedge, and further indicates the position of the golf ball from the pin.

Entering the green zone 87 triggers a plurality of events. First, a list of golf clubs, such as a choice of putter, can be displayed. As well, distance from the pin and a detailed map of the green can be provided to aid the player on putting. Note that some zone-aware items can trigger additional events, such as a golf ball tracking system that creates zone triggers. Finally, the cup zone 88 triggers a zone change when the golf ball enters the cup, which is queried to the user.

Figure 8:
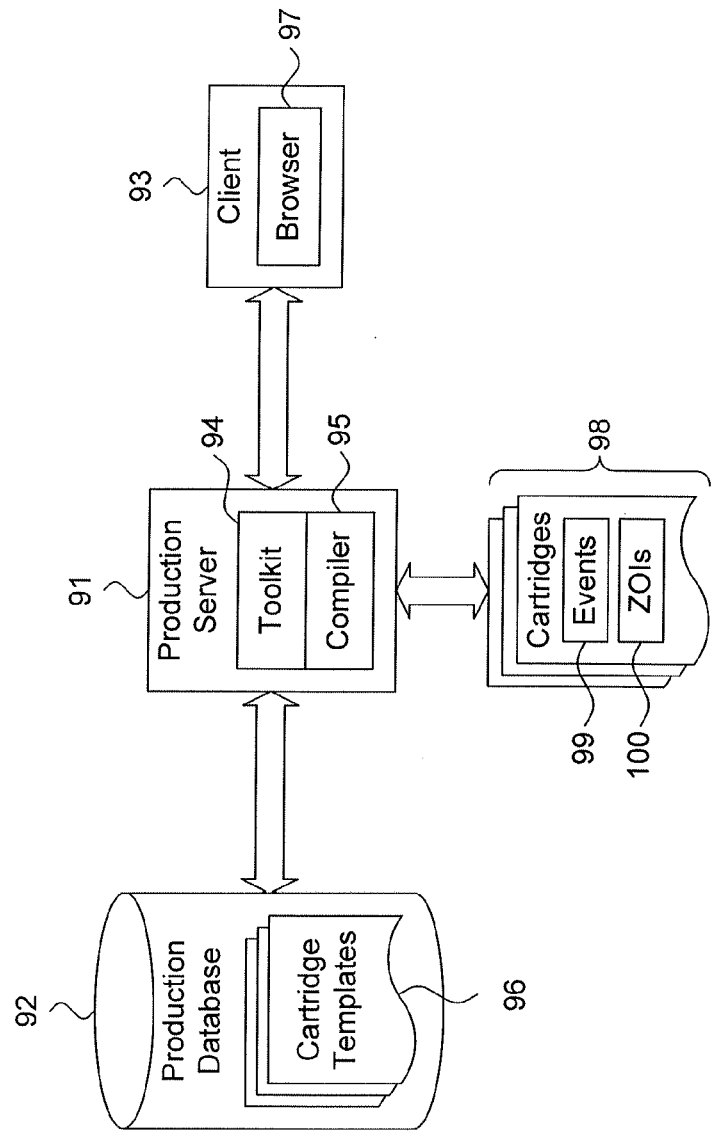
FIG. 8 is a block diagram showing the functional software components of a production system for use with the system of FIG. 1.

FIG. 8 is a block diagram showing the functional software components of a production system 90 for use with the system of FIG. 1. Each component is a computer program, procedure or process written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave.

The production system 90 provides a tool set with which to build user-customizable cartridges 98 for use with wireless computing devices 12 (shown in FIG. 1). The cartridges 98 are generated by a production server 91 based on an author's instructions that are received from a client 93. For instance, the author provides data for defining zones of influence and user events. Once the cartridge is complete, a user can select the cartridge for executing on his WCD. The author can also select the cartridge for executing on a WCD, as well as selecting other cartridges by other authors.

The production server 91 includes two components: a toolkit 94 and compiler 95. The toolkit 94 is accessed via the client 93 through a standard Web browser 97, such as the Internet Explorer or Netscape Navigator. The toolkit 94 accesses a production database 92 in which are stored cartridge templates 96, preferably expressed in a page description language, such as the Extensible markup Language (XML), such as further described below with reference to FIG. 9.

The toolkit 94 enables a user to define a series of events 99 that are triggered by temporal, locational and independent conditions and to define zones of influence (ZOIs) 100 described by geolocational data. Upon the completion of definition, the cartridge templates 96 are compiled by the compiler 95 into interpretable cartridges 98 for downloading and execution on a wireless computing device 12 (shown in FIG. 1). Although the production server 91 incorporates components XML through a standard Web browser 97, neither the production server 91, nor the took kit 94 and compiler 95 need be made available as Web-based applications and could be implemented as standard stand-alone or distributed applications and other variations, as would be recognized by one skilled in the art.

Figure 9:
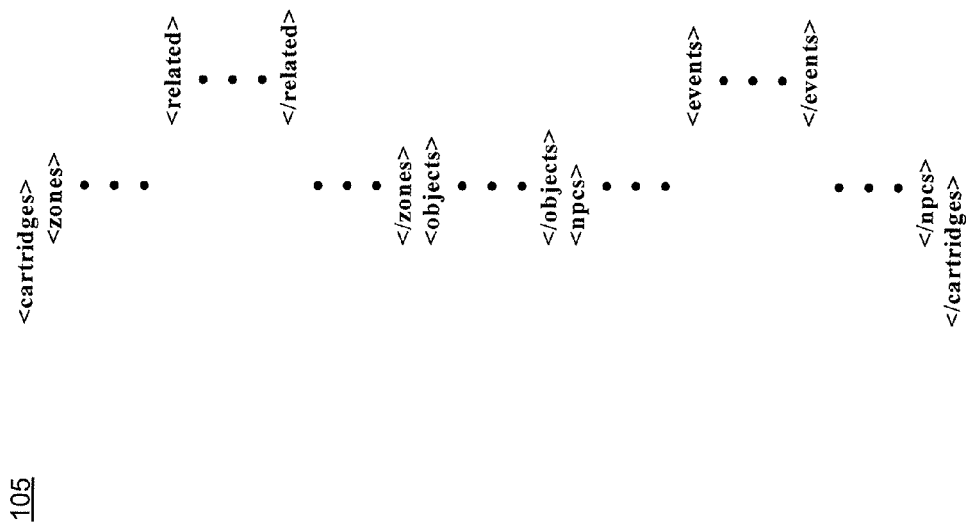
FIG. 9 is a data structure diagram showing the cartridge template utilized by the toolkit of the system of FIG. 8.

FIG. 9 is a data structure diagram showing the cartridge template 105 utilized by the toolkit of the system of FIG. 8. In the described embodiment, the cartridge template 105 is written in XML, although another form of tag-delineated page description language could be used, as would be recognized by one skilled in the art. The cartridge template 105 includes a plurality of tags to identify zones of influence (<zones>), objects (<objects>), and non-player characters (<npcs>). Each tag for a zone of influence can further define relationships through a related tag (<related>). In addition, the tag for each mobile device can define user-specified events (<events>). The events can be generic or device-dependent and include multimedia events, including sound, visual, tactile, olfactory, text, and multimedia effects, as well as other user messages and communications, such as triggering a telephone call. By way of example, a source code listing for a cartridge implementing a generic golf course, such as described above with reference to FIG. 7, written in the XML programming language is included in the Appendix. Other programming languages or procedural and data structuring could be employed, as would be recognized by one skilled in the art.

Figure 10:
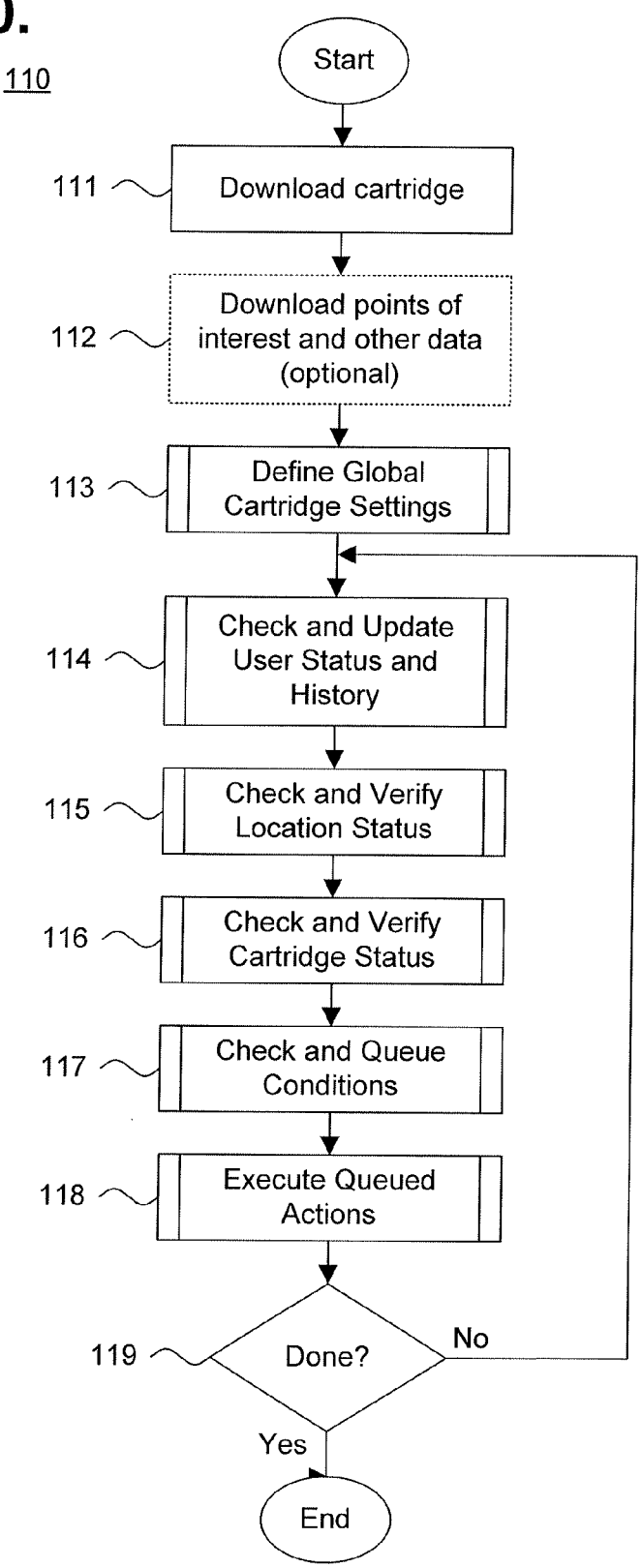
FIG. 10 is a flow diagram showing a method of executing user events triggered through geolocational data describing zones of influence, in accordance with the present invention.

FIG. 10 is a flow diagram showing a method 110 of executing user events triggered through geolocational data describing zones of influence, in accordance with the present invention.

The method 110 functions as a continuous control loop (blocks 114-119) executed on a wireless computing device 12 (shown in FIG. 1). During each iteration of the control loop, the status of various aspects of the wireless computing device 12 and cartridge 13 are examined and user events are executed in an event-driven manner using a queue.

Preliminarily, a cartridge 13 is downloaded from the centralized server 14 (shown in FIG. 1A) (block 111). Optionally, points of interest and other data is downloaded (block 112). Global cartridge settings are then defined (block 113). The user status and history are checked and updated (block 114), as further described below with reference to FIG. 11. Next, the location status is checked and verified (block 115), as further described below with reference to FIG. 12. The status of the cartridge 13 is checked and verified (block 116), as further described below with reference to FIG. 13. Queue conditions are checked (block 117), as further described below with reference to FIG. 14. Finally, any queued event actions are executed (block 118), as further described below with reference to FIG. 15. The control loop (blocks 114-119) continues until all actions are done (block 119), after which the method terminates.

Figure 11:
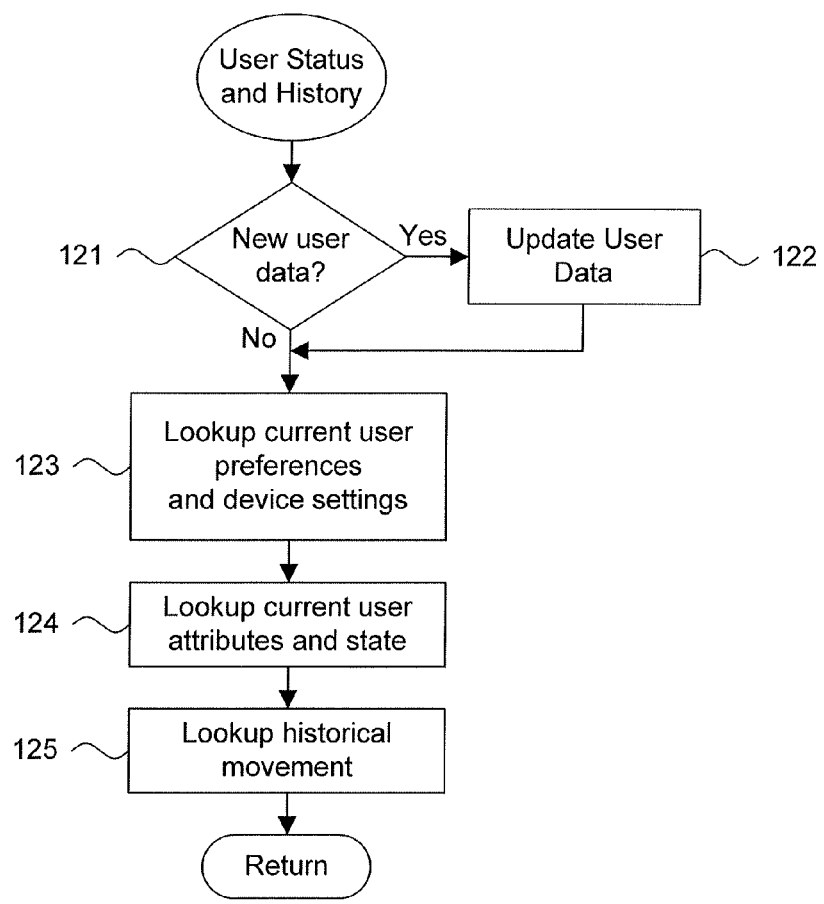
FIG. 11 is a flow diagram showing a routine for checking and updating user status and history for use in the method of FIG. 10.
Figure 14:
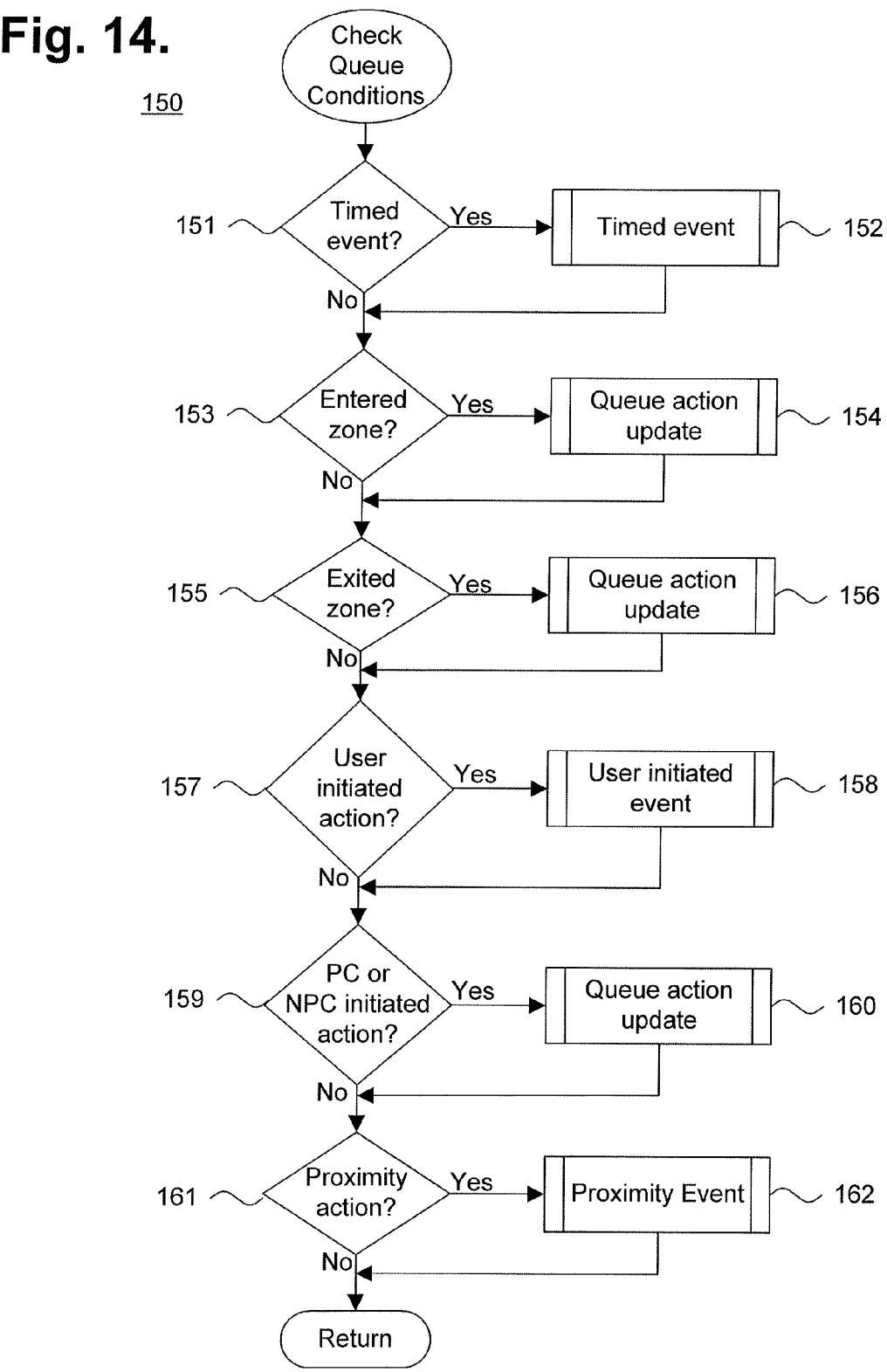
FIG. 14 is a flow diagram showing a routine for checking queue conditions for use in the method of FIG. 10.

FIG. 11 is a flow diagram showing a routine 120 for checking and updating user status and history for use in the method of FIG. 14. The purpose of this routine is to maintain historical user information regarding preferences, attributes and historical movements.

If the user data is new (block 121), the user data stored with the cartridge 13 of the wireless computing device 12 (shown in FIG. 1) is updated (block 122) to load default preferences, attributes and an initial position. Thereafter, the current user preferences and device settings (block 123), the current user attributes and state (block 124), and the historical movements (block 125) are looked up. The user preferences include notifying the user upon entry into a zone of influence, enabling flash feedback, and showing text-only feedback instead of graphical feedback. The device settings control color, monochrome, sound, screen size, video capabilities, telephone capabilities, electronic mail, short messaging service (SMS), paging, and execution of client-side code, such as J2EE scripts. User state indicates whether the user is in motion, speed, score, game state, movement history (route data), last known position, direction of movement, attributes (healthy, sick, sad, happy, and so forth), inventory, spells, characters, and access to a telephone. Historical movements are tracked by location, speed, altitude, direction, and distance. Other types and combinations of user preferences, device, settings, and state are feasible, as would be recognized by one skilled in the art. The routine then returns.

Figure 12:
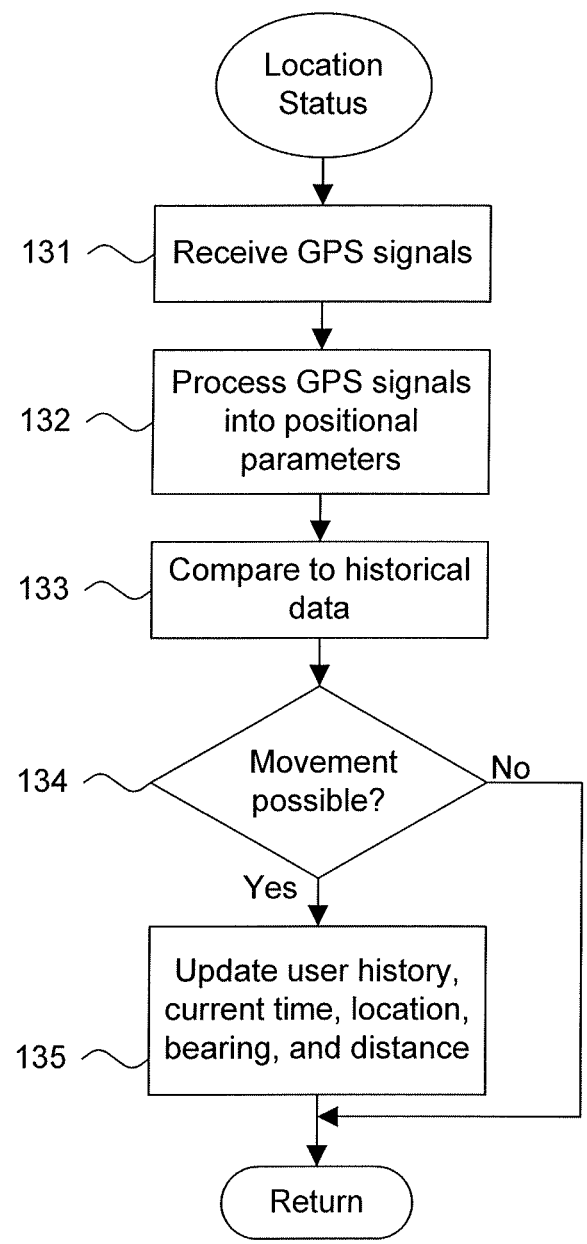
FIG. 12 is a flow diagram showing a routine for checking and verifying a location status for use in the method of FIG. 10.

FIG. 12 is a flow diagram showing a routine 130 for checking and verifying a location status for use in the method of FIG. 10. The purpose of this routine is to provide a "reality" check on an updated user movement. Improbable user movements are rejected.

First, GPS signals are received by the wireless computing device 12 (block 131) and processed into geolocational data (block 132), preferably in terms of latitudinal and longitudinal values. The geolocational data is compared to the historical data (block 133) stored as historical movements in the user data. If the movement is possible (block 134), the user history, current time, location, bearing and distance are updated (block 135). Otherwise, no update is performed. In the described embodiment, a movement is possible if, based on the user data stored with the cartridge 13 in the wireless computing device 12, the current location can be achieved in the time frame relative to the location, speed, altitude, direction and distance from the last update. The routine then returns.

Figure 13:
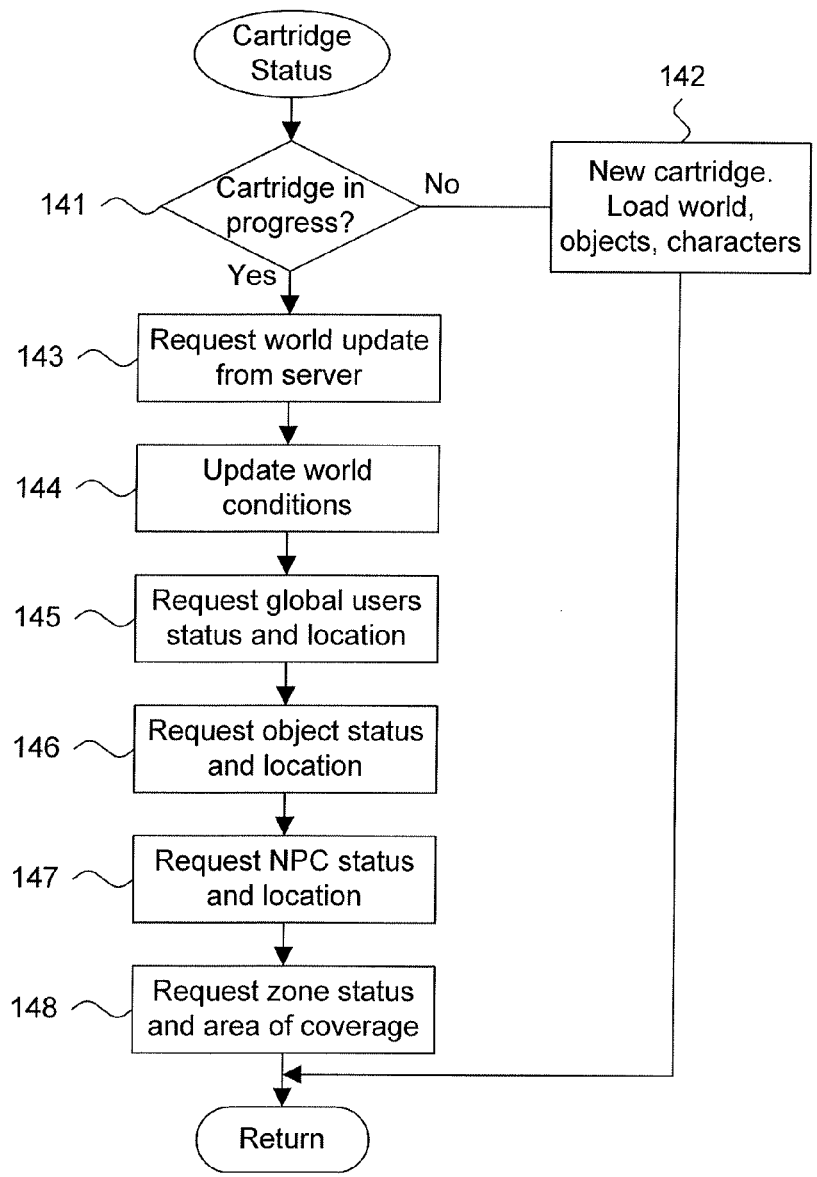
FIG. 13 is a flow diagram showing a routine for checking and verifying a cartridge status and history for use in the method of FIG. 10.

FIG. 13 is a flow diagram showing a routine 140 for checking and verifying a cartridge status and history for use in the method of FIG. 10. The purpose of this routine is to update the status of the cartridge 13 of the wireless computing device 12 (shown in FIG. 1).

If no cartridge is currently in progress (block 141), a new cartridge is loaded with a virtual world, objects and characters (block 142), after which the routine returns. Otherwise, if a cartridge is in progress (block 141), a world update is requested from the centralized server 14 (shown in FIG. 1) (block 143) and world conditions are updated within the in-progress cartridge 13 (block 144). Note the world conditions update could also be determined locally on cartridges in progress on a non-wireless computing device running a cartridge autonomously. The routine then returns.

Next, the status and locations of global users are requested from the centralized server 14 (block 145). The status and locations of objects are requested from the centralized server 14 (block 146). The status and locations of any non-player characters (NPCs) are requested from the centralized server 14 (block 147). Finally, the status and areas of coverage of the zones of influence 61-64 (shown in FIG. 6) are requested from the centralized server 14 (block 148). The status and location of the various users, objects, characters, and zones could be physical or virtual or a combination thereof. The routine then returns.

FIG. 14 is a flow diagram showing a routine 150 for checking queue conditions for use in the method of FIG. 10. The purpose of this routine is to determine the condition of the queue based on a player action. The types of actions that affect queue conditions include timed events, zone of influence entries and exits, user-, player character- and non-player character-initiated actions, and proximity actions.

If the current action is a timed event (block 151), a timed event is processed (block 152), as further described below with reference to FIG. 16. If the action is the entry into a zone of influence 61-64 (shown in FIG. 6) by the user (block 153), a queue action and update is performed (block 154), as further described below with reference to FIG. 17. Similarly, if the user has exited the zone of influence 31-34 (block 155), a queue action and update is performed (block 156), as further described below with reference to FIG. 17. If the action is a user-initiated action (block 157), a user-initiated event is performed (block 158), as further described below with reference to FIG. 18. If the action is a player-character- or non-player-character-initiated action (block 159), a queue action and update is performed (block 160), as further described below with reference to FIG. 17. Finally, if the action is a proximity action (block 161), a proximity event is performed (block 162), as further described below with reference to FIG. 19. The routine then returns.

Figure 15:
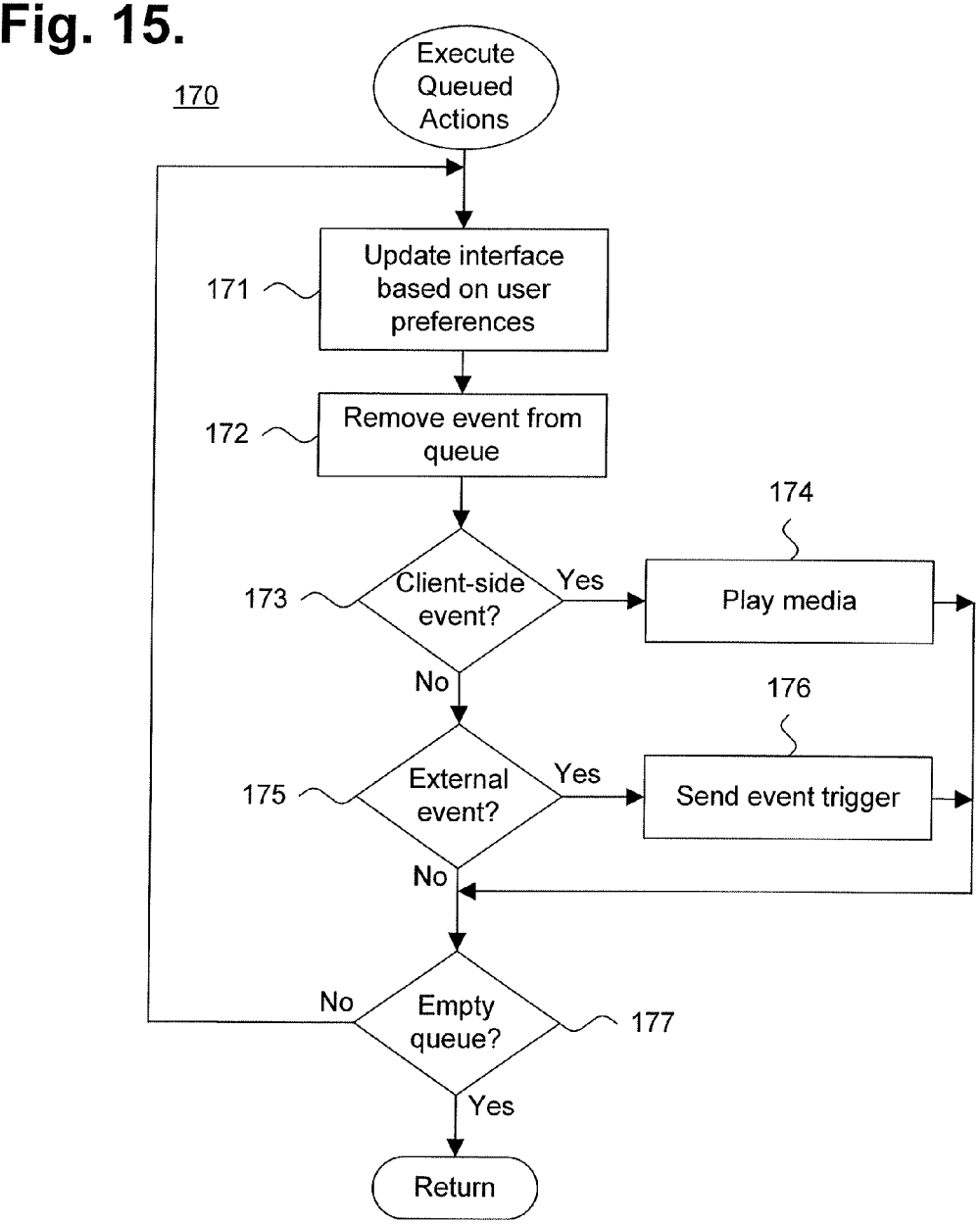
FIG. 15 is a flow diagram showing a routine for executing queued actions for use in the method of FIG. 10.

FIG. 15 is a flow diagram showing a routine 170 for executing queued actions for use in the method of FIG. 10. The purpose of this routine is to retrieve and execute actions placed in the event queue of the cartridge 13 in the wireless computing device 12 (shown in FIG. 1).

First, the user interface is updated based on user preferences (block 171). Next, an event is removed from the queue (block 172). If the event is a client-side event (block 173), the client-side event is performed (block 174) on the wireless computing device 12. Playing a media clip or sound is an example of a client-side event. Other types of client-side events are possible, as would be recognized by one skilled in the art. Otherwise, if the event is an external event (block 175), an event trigger is sent (block 176) to the external device, such as a telephone or similar instrument. Note the event trigger could also be sent to the centralized server for a team (shown in FIG. 1) to generate other triggers, such as unlocking a door. Finally, if the event queue is not empty (block 177), processing continues (block 172-176) until the queue is empty (block 177), after which the routine returns.

Figure 16:
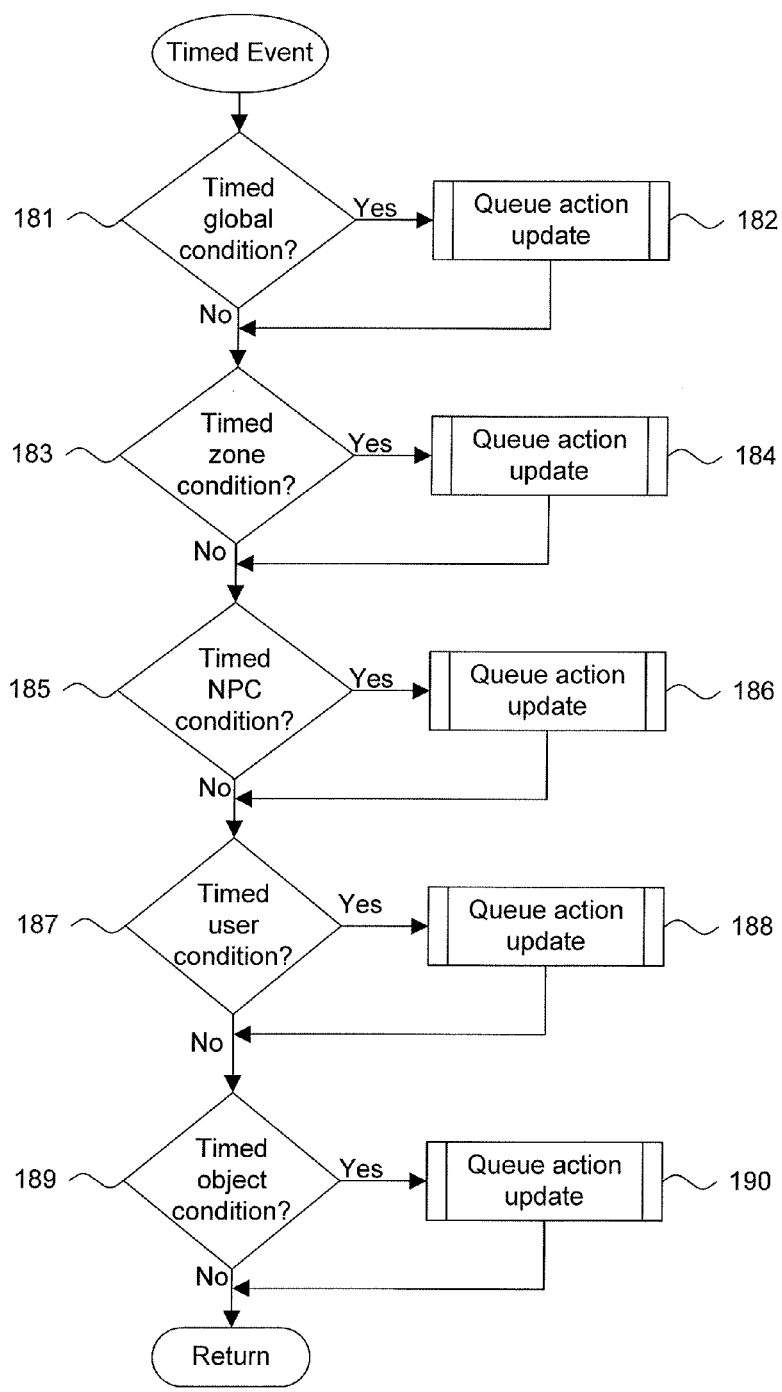
FIG. 16 is a flow diagram showing a routine for performing a timed event for use in the routine of FIG. 14.

FIG. 16 is a flow diagram showing a routine 180 for performing a timed event for use in the routine of FIG. 13. The purpose of this routine is to execute a timed event relative to an internal timer maintained by the cartridge 13 in the wireless computing device 12 (shown in FIG. 1).

First, if the timed event is a timed global condition (block 181), a queue action and update is performed (block 182), as further described below with reference to FIG. 16. Similarly, if the event is a timed zone condition (block 183), timed non-player character condition (block 185), timed user condition (block 187), or timed object condition (block 189), a queue action update is likewise performed (blocks 184, 186, 188, and 190, respectively), as further described below with reference to FIG. 17. The routine then returns.

Figure 17:
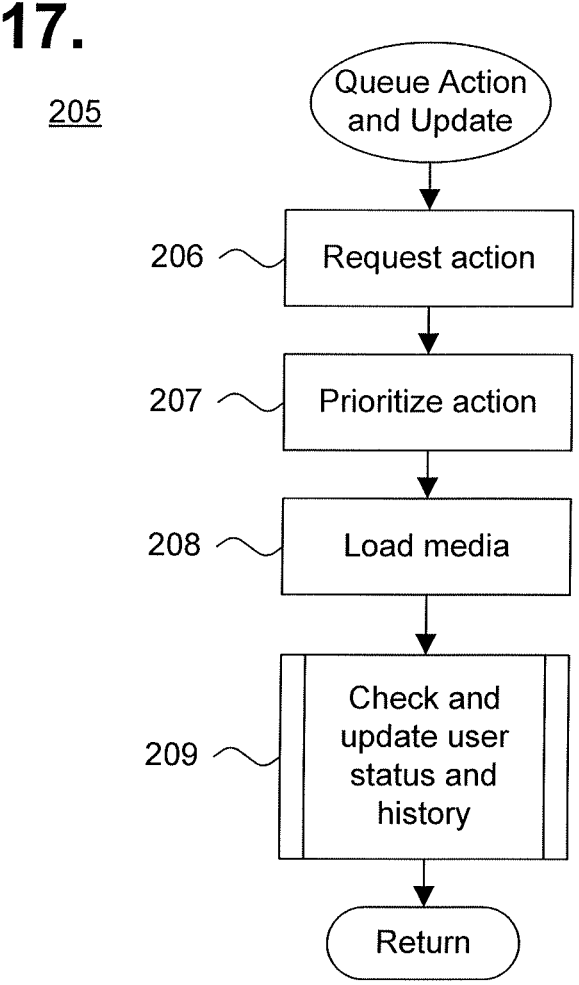
FIG. 17 is a flow diagram showing a routine for performing a queue action and update for use in the routines of FIGS. 14, 16, 18 and 19.

FIG. 17 is a flow diagram for performing a queue action 205 and update for use in the routines of FIGS. 13, 14, 15, and 169. The purpose of this routine is to place event actions into the queue of the cartridge 13 in the wireless computing device 12 (shown in FIG. 1).

First, the action is requested from the cartridge 13 (block 206) and prioritized (block 207). In the described embodiment, actions are sorted and enqueued to prioritize the actions. Next, any media is loaded (block 208), for instance, a sound file is retrieved to play a sound effect. Finally, the user status and history are checked and updated (block 209), as further described above with reference to FIG. 13. The routine then returns.

Figure 18:
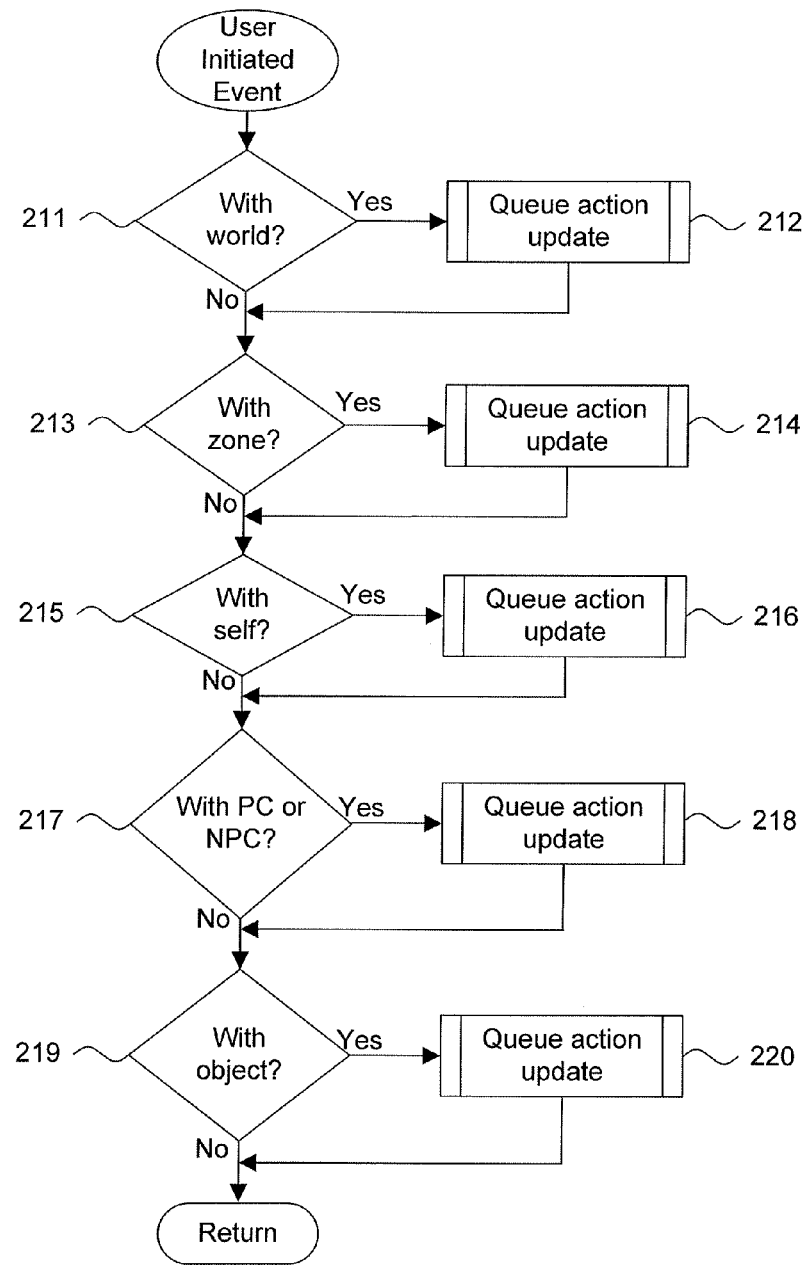
FIG. 18 is a flow diagram showing a routine for performing a user-initiated event for use in the routines of FIG. 14.

FIG. 18 is a flow diagram showing a routine 210 for performing a user-initiated event for use in the routine of FIG. 14. The purpose of this routine is to identify and enqueue a user-initiated event.

If the user-initiated event interacts with the world (block 211), a queue action and update is performed (block 212), as further described above with reference to FIG. 16. Similarly, if the user-initiated event interacts with a zone of influence 61-64 (shown in FIG. 6) (block 213), with the user (block 215), with a player character or non-player character (block 217), or with an object, (block 219), a queue action and update is performed (blocks 214, 216, 218, 220, respectively), as further described above with reference to FIG. 16. The routine then returns.

Figure 19:
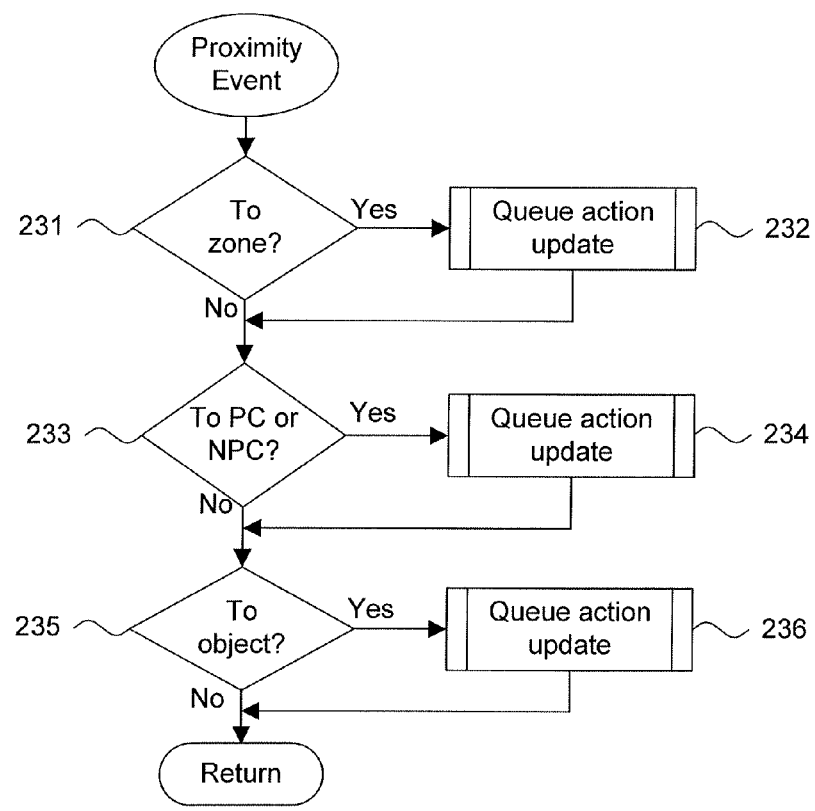
FIG. 19 is a flow diagram showing a routine for performing a proximity event for use in the routine of FIG. 14.

FIG. 19 is a flow diagram showing a routine 230 for performing a proximity event for use in the routine of FIG. 14. The purpose of this routine is to identify and execute a proximity event.

First, if the proximity event is relative to a zone of influence 31-34 (shown in FIG. 2) (block 231), a queue action and update is performed (block 232), as further described above with reference to FIG. 16. Similarly, if the proximity event is relative to a player character or non-player character (block 233), or an object (block 235), a queue action and update is performed (blocks 234 and 236, respectively), as further described above with reference to FIG. 16. The routine then returns.

Figure 20:
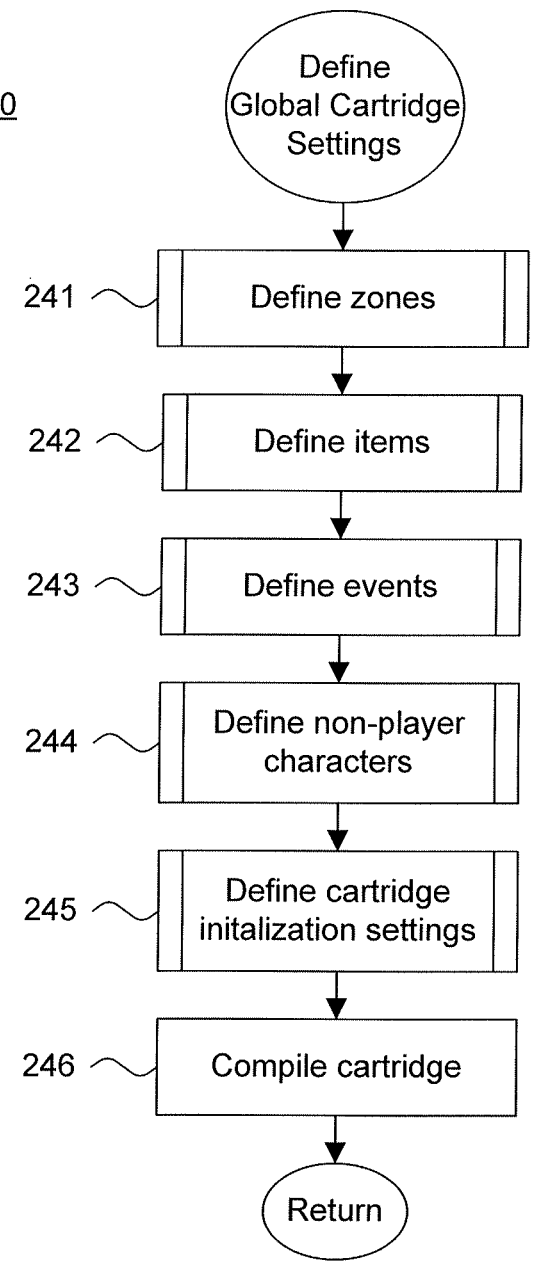
FIG. 20 is a flow diagram showing a routine for defining global cartridge settings for use in the method of FIG. 10.

FIG. 20 is a flow diagram showing a routine 240 for defining global cartridge settings for use in the method of FIG. 8. The purpose of this routine is to specify a collection of zones of influence, items, events, and non-character players, which collectively provide a user experience in the physical world using geolocational data.

First, zones of influence are defined (block 241), as further described below with reference to FIG. 21. Items are defined (block 242), as further described below with reference to FIG. 22. Events are defined (block 243), as further described below with reference to FIG. 23. Non-player characters (NPCs) are defined (block 244), as further described below with reference to FIG. 24. Cartridge initialization settings are defined (block 245), as further described below with reference to FIG. 25. Finally, the cartridge 13 (shown in FIG. 1A) is compiled (block 246) into program code interpretable by the wireless computing device 12. The routine then returns.

Figure 21:
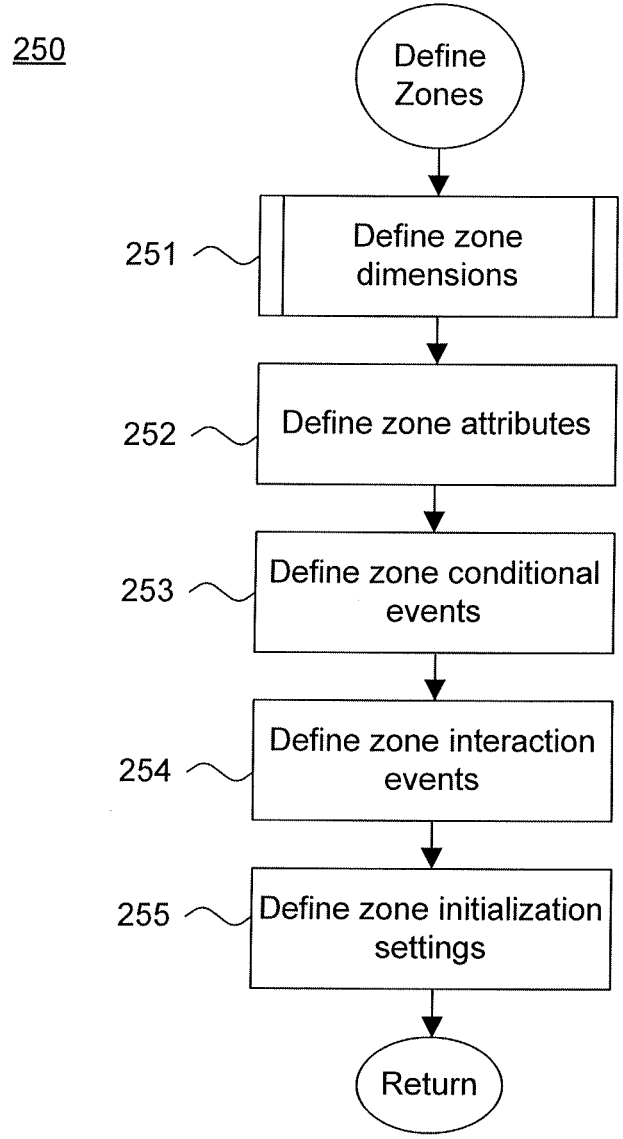
FIG. 21 is a flow diagram showing a routine for defining zones of influence for use in the routine of FIG. 20.

FIG. 21 is a flow diagram showing the routine 250 for defining zones of influence for use in the routine of FIG. 20. The purpose of this routine is to specify zone geolocational data and to associate events with zones.

First, the dimensions of each zone of influence are defined (block 251), as further described below with reference to FIG. 26. The zone attributes are then defined (block 252). The attributes include initialization and state settings and relationships to other zones of influence. For instance, if the present zone of influence inherits from a parent zone, the attributes for the parent zone of influence are copied. Next, any events which occur conditionally with respect to the zone of influence are defined (block 253).

In addition, events defining interactions between zones of influence are defined (block 254). Interaction events carry over between successive zones of influence to provide a continuous storyline. Finally, the initialization settings for the zone of influence are defined (block 255), after which the routine returns.

Figure 22:
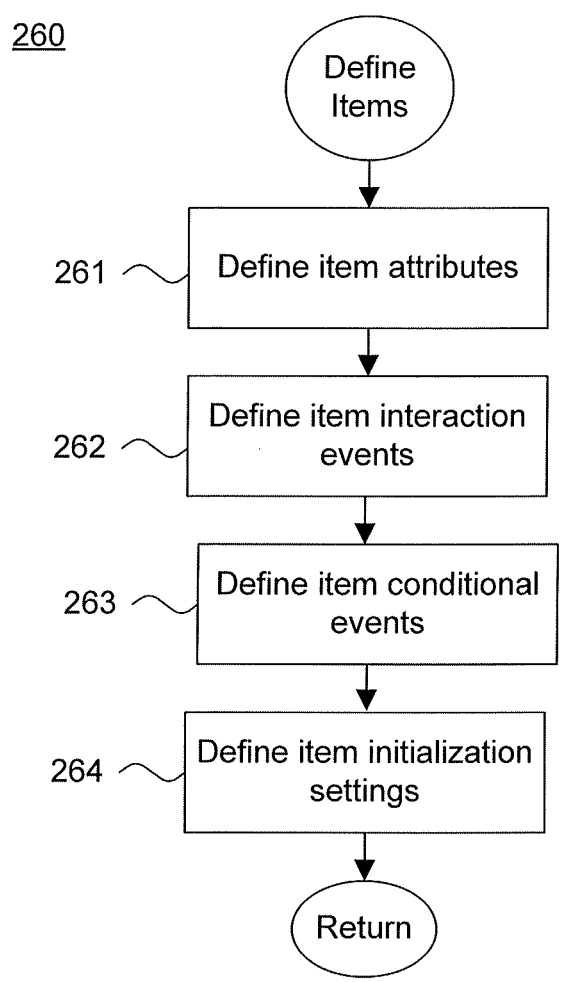
FIG. 22 is a flow diagram showing a routine for defining items for use in the routine of FIG. 20.

FIG. 22 is a flow diagram showing the routine 260 for defining items of influence for use in the routine of FIG. 20. The purpose of this routine is to specify virtual or physical objects, which can be manipulated through the various events associated with the zones of influence.

First, attributes for each item are defined (block 261). Item attributes include both logical and physical characteristics, such as color, size and description. The interaction between the items and events are then defined (block 262). Similarly, events which are conditioned on an item are defined (block 264). Finally, item initialization settings are defined (block 264), after which the routine returns.

Figure 23:
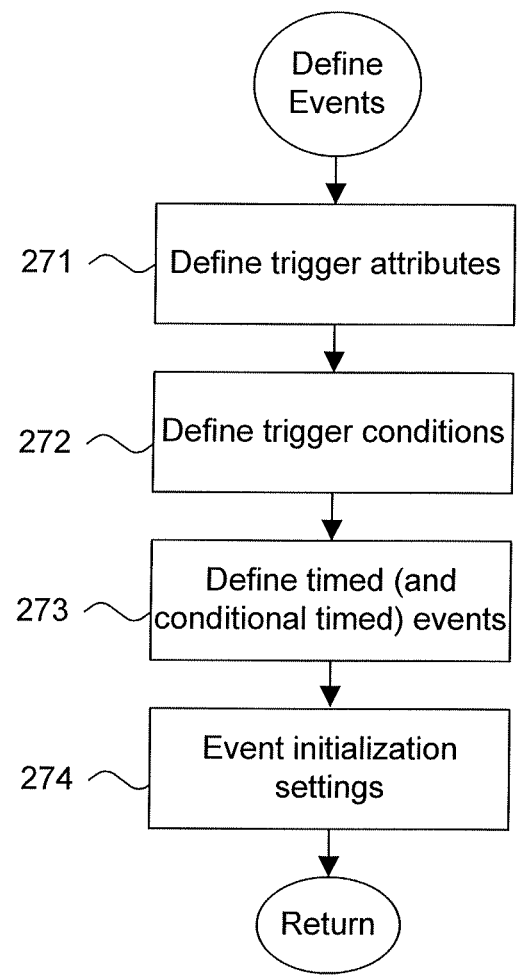
FIG. 23 is a flow diagram showing a routine for defining events for use in the routine of FIG. 20.

FIG. 23 is a flow diagram showing the routine 270 for defining events for use in the routine of FIG. 20. The purpose of this routine is to specify time-based triggers, which occur programmatically within a cartridge.

First, trigger attributes are defined (block 281). The trigger attributes include properties specific to the type of trigger defined, such as timer values or exact times. Next, trigger conditions are defined (block 272), such as conditions which exist at certain time intervals or exact times. Similarly, timed and conditionally timed events are defined (block 273). Finally, event initialization's settings, such as for recurring events, are defined (block 274). The routine returns.

Figure 24:
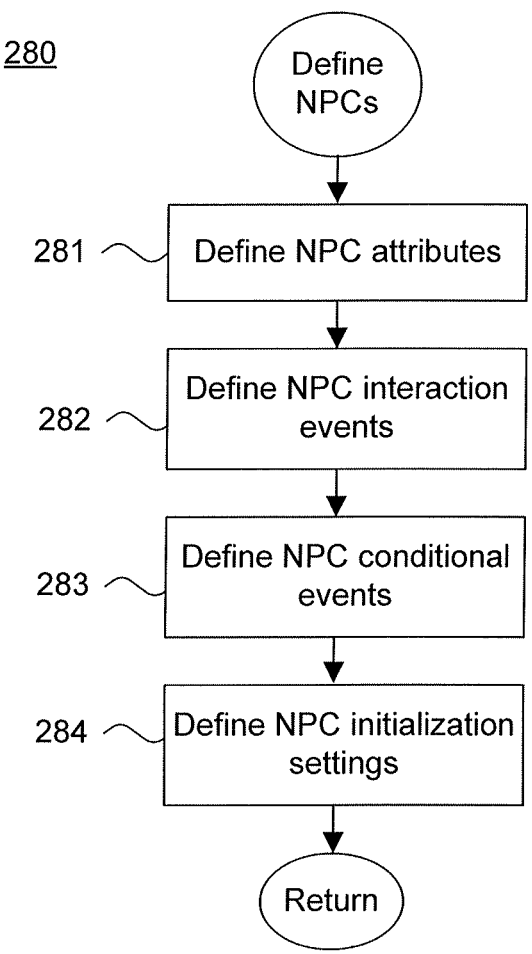
FIG. 24 is a flow diagram showing a routine for defining non-player characters for use in the routine of FIG. 20.

FIG. 24 is a flow diagram showing the routine 280 for defining non-player characters for use in the routine of FIG. 20. The purpose of this routine is to create a fictional non-participative character with whom a player character can interact through query and response behaviors.

First, the attributes of the non-player characters are defined (block 281). These attributes are similar to those defined for a player character with the addition of cartridge-specific characteristics. Interactions between the non-player characters and events are then defined (block 282). Similarly, events conditioned on the non-player characters are defined (block 283). Finally, non-player character initialization settings are defined (block 284), after which the routine returns.

Figure 25:
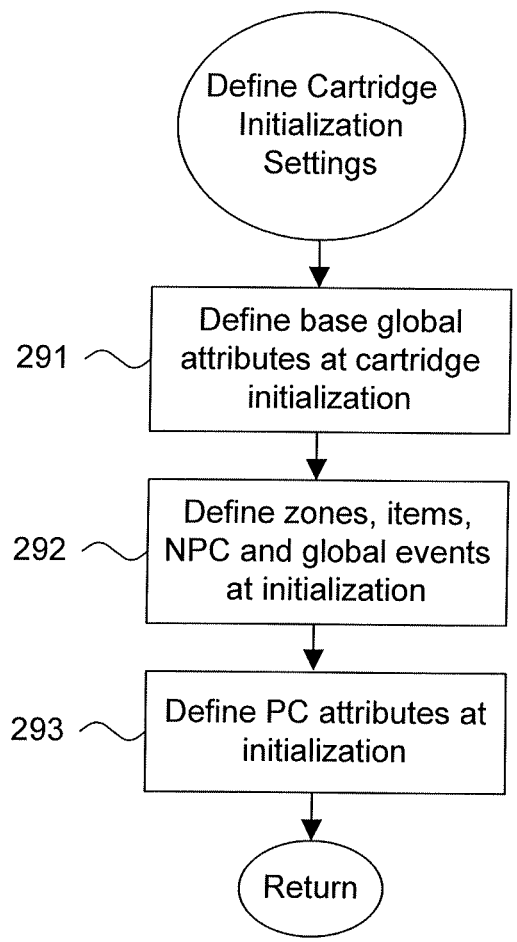
FIG. 25 is a flow diagram showing a routine for defining cartridge initialization settings for use in the routine of FIG. 20.

FIG. 25 is a flow diagram showing the routine 290 for defining cartridge initialization settings for use in the routine of FIG. 20. The purpose of this routine is to specify the initial values for the various characteristics for a cartridge storing a sequence of events for a set of zones of influence.

First, the base level attributes for the cartridge upon initialization are defined (block 291). The zones of influence, items, non-player characters, and global events present at initialization are defined (block 292). Lastly, the player character attributes at initialization for the current player are defined (block 293). The routine then returns.

Figure 26:
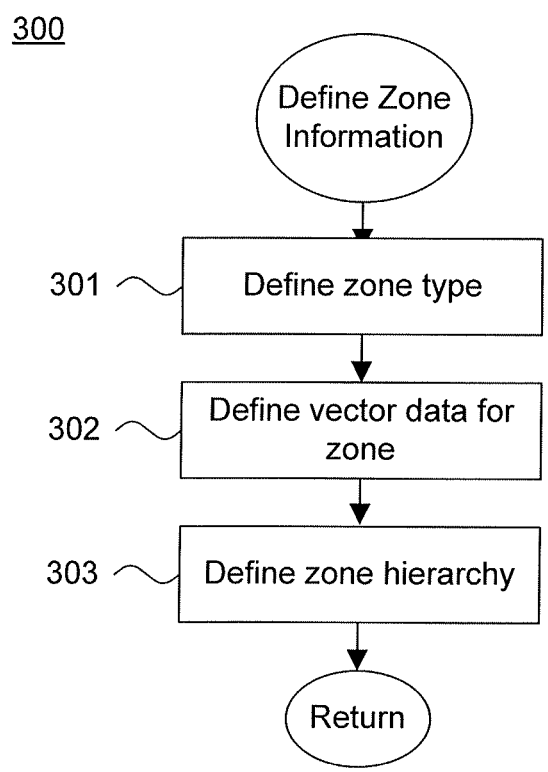
FIG. 26 is a flow diagram showing a routine for defining zone information for use in the routine of FIG. 21.

FIG. 26 is a flow diagram showing the routine 300 for defining zone information for use in the routine of FIG. 21. The purpose of this routine is to specify the geolocational data for a zone of influence.

First, a zone of influence type is defined (block 301). As described above with reference to FIGS. 2A-B, 3A-B, 4, and 5A-B, zones of influence can be two- or three-dimensional and be defined by vector or radius values, or combinations thereof. Next, vector data specifying the zone of influence dimensions are defined (block 302). Finally, the hierarchy for the zone, that is, level, is defined (block 303), if applicable. The routine then returns.

Figure 27:
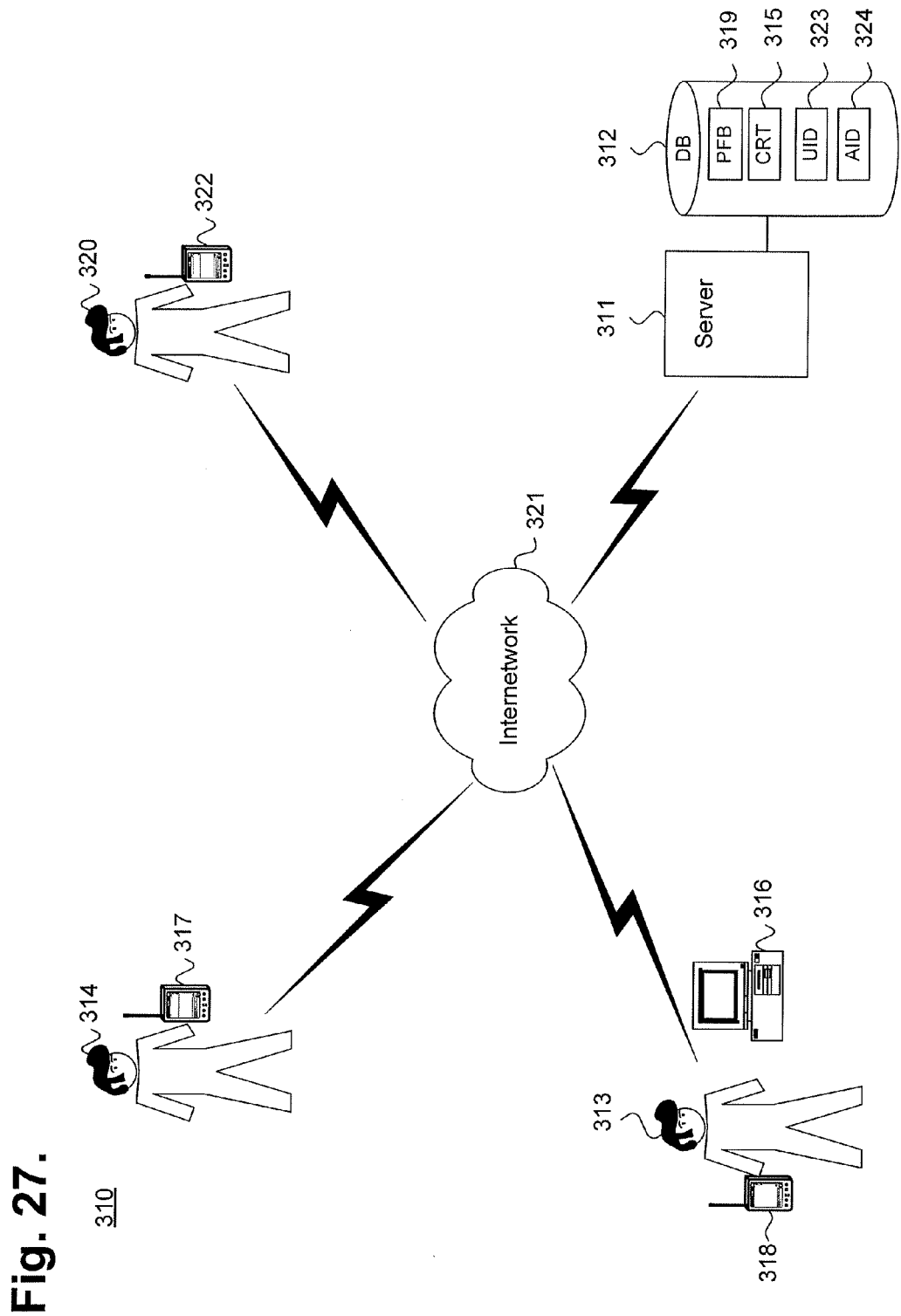
FIG. 27 is a block diagram showing authorized user access.

Once defined, the global cartridge settings can be compiled into a script of program code for a cartridge, which can be made publicly accessible through cartridge publication. Access to the published cartridges can be restricted. FIG. 27 is a block diagram 310 showing authorized user access. Published cartridges 315 can be stored in a database 312 coupled to a centralized server 311. A user 314 can obtain access to the database 312 by entering a user password or user identification number 323 into a wireless computing device ("WCD") 317. The WCD 317 communicates with the server 311 via an internetwork 321, such as the Internet. Other user identifications, methods for obtaining access to the database, and user devices are possible, including no user authorization. Upon verification, the user 314 can review, select, and download a cartridge 315 from the database 312 onto the WCD 317. The user 314 can immediately execute the cartridge 315 or store the cartridge 315 for later use.

Similarly, an author 313 of a cartridge 315 can obtain access to the database 312 by an author client 316 or author WCD 318 via the Internet 321. The author 313 is verified through authorization of an author password or author identification number 324. Other methods of identifying the author and author devices are possible. If successful, the verified author 313 can access unpublished cartridges 315, which he has previously defined, as well as, completed cartridges 315 by other users.

In a further embodiment, the user 314 can compete against one or more other users 320. The other user can access the stored cartridges 315 with his WCD 322 via the internetwork 321. To access the cartridges, the other user may be required to provide user identification 323, such as a user password or user identification number. Other user identification and other user devices are possible.

During execution of the cartridge 315, the user's WCD 317 collects event related data 315, which can be stored. Upon completion or termination of the cartridge, the user can voluntarily decide whether he would like to send the event related data to the server 311 as play feedback 319 for that cartridge. If sent, an authorized user, such as the author 313 can access the play feedback 319 related to the user 314 and the cartridge 315 via the client 316 or the WCD 318. Other authorized users are possible. Access to the play feedback 319 can be restricted based on an author identification, which can be the same as or different from the author verification for accessing cartridges. Play feedback is further discussed below with reference to FIGS. 32-34.

Figure 28:
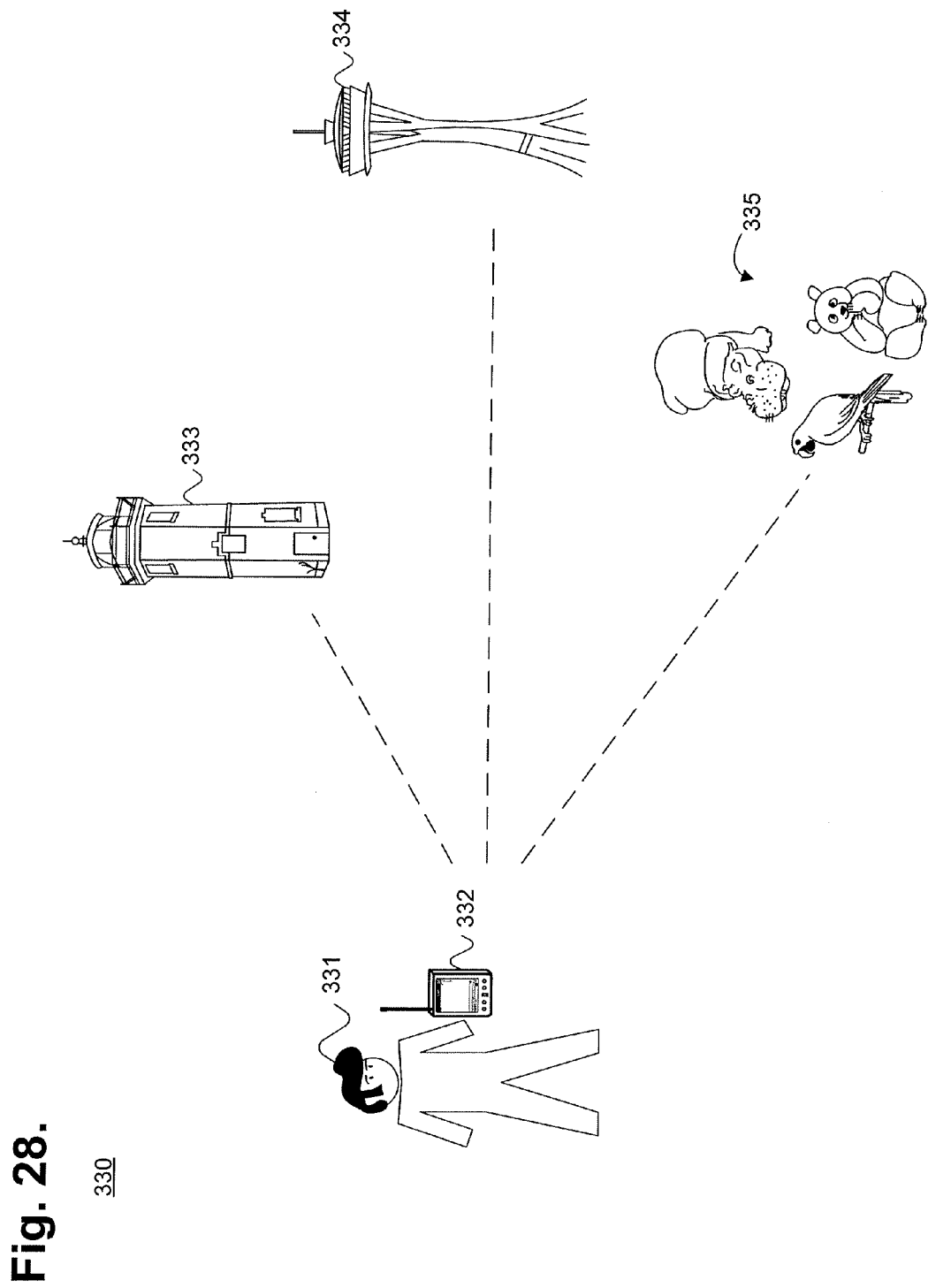
FIG. 28 is a block diagram showing a user with a wireless computing device.

Upon obtaining access to the database, the user can request specific cartridges or a group of cartridges. FIG. 28 is a block diagram 330 showing a user 331 with a WCD 332. The WCD 332 can include a GPS receiver, which processes GPS signals to determine a location of the WCD 332. The WCD 332 transmits the location to a server, which stores geolocational data for cartridges, landmarks, and waymarks. Other types of geolocational data are possible.

Once received by the server, the location of the WCD 332 is compared with geolocational data stored by the server based on a request from the user 331. For example, a user may send a request to the server via the WCD 332 for landmarks located in Seattle, Wash. The server sorts the landmarks by the associated geolocational data and selects those landmarks located in Seattle, Wash. Informational data for Alki Point Lighthouse 333, the Space Needle 334, and Woodland Park Zoo 335 are returned to the user via the WCD 332. The informational data can include, the coordinates for each landmark, a distance between the user 331 and a landmark, and a direction of the landmark in relation to the location of the WCD 332. Other types of informational data are possible.

Geolocational data can also be stored for the cartridges, which are stored in a database coupled to the server. The geolocational data can include a start location for execution of the sequence of events in the cartridge. In an example, a user requests available cartridges that have a start location for execution of the sequence of events that begin within 20 miles of his location, as determined by the WCD 332. The server compares the location of the WCD 332 with the stored geolocational data for the cartridges. The cartridges are selected by the geolocational data associated with the start origin. Those cartridges having start location of the sequence of events within 20 miles of the user's location are selected for displaying to the user on the WCD 332. Other types of requests are possible.

Figure 29:
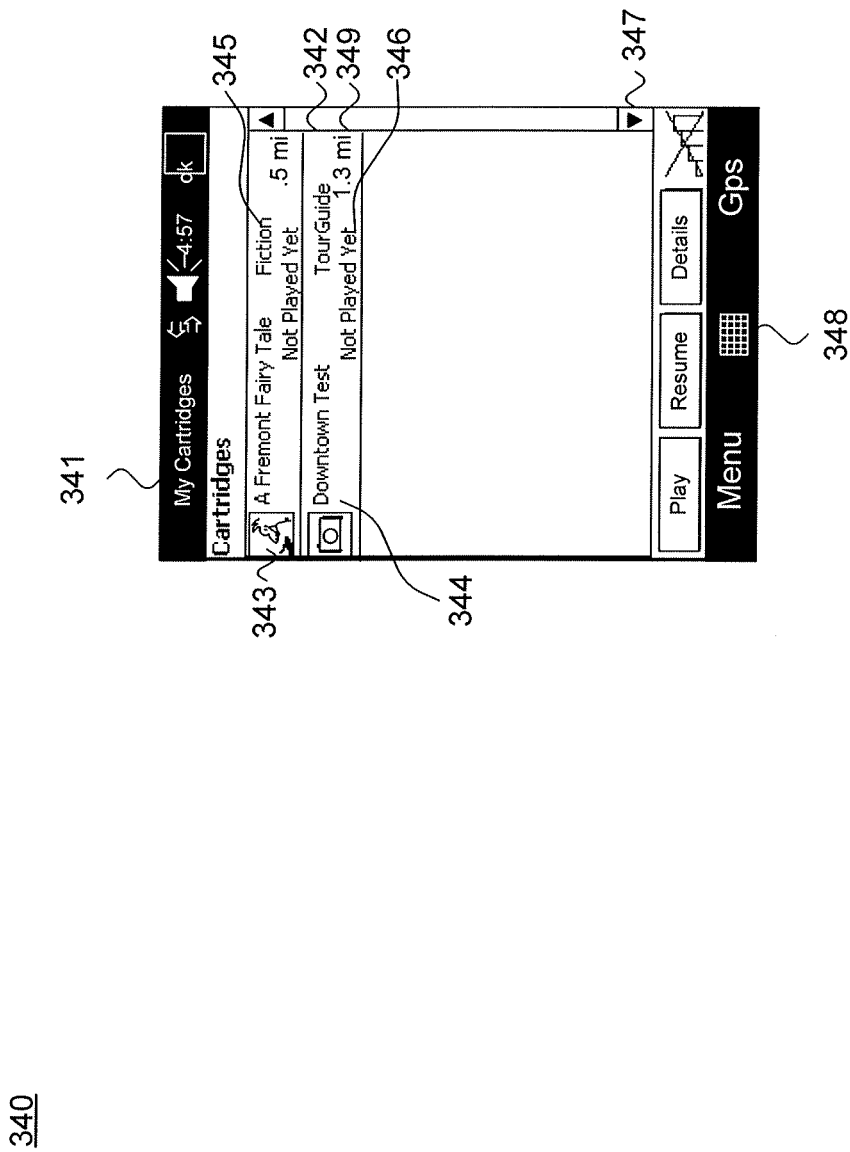
FIG. 29 is a screen shot showing, by way of example, a Cartridge Selection page, which lists cartridges that satisfy a user request.

FIG. 29 is a screen shot 340 showing, by way of example, a Cartridge Selection page 341, which lists cartridges 342 that satisfy a user request. The Cartridge Selection page 341 is displayed visually on a WCD and the list of cartridges 342 can include all cartridges previously downloaded by the user or alternatively, only those cartridges nearest to the user's current location. Other forms of cartridge listings and types of user requests are possible.

Each cartridge 342 displayed can include, for instance, a title 344, an activity identifier 345, an icon 343, and a player status 346. Other data is possible. The activity identifier 345 describes the cartridge as belonging to a specific type of activity, including fiction, a puzzle, or a guide. Other types of cartridges are possible, such as a story, sightseeing, or geocache. An icon 343 can be associated with the type of cartridge for easy player reference, such as an image of a camera 343 for a guide cartridge. Each listed cartridge 342 also indicates the status 346 of the cartridge, including whether the player has played, completed, or attempted a particular cartridge. A distance 349 for each cartridge can also be included. The user can sort the cartridges based on the distance, as well, as other cartridge identifiers.

Large lists of cartridges can be difficult to manage and can prevent a player from quickly finding a desired cartridge. The player can sort the list of cartridges by title, distance, type, or status using a column header (not shown) for conveniently listing and locating a particular cartridge. Additionally, a scroll bar is accessible for displaying and viewing large cartridge lists.

Although the Cartridge Selection page 341 can be accessed without the use of GPS data, the player is provided with additional features when a GPS signal is acquired. For example, without the use of GPS data or manual coordinates, an unfiltered list of all downloaded cartridges can be displayed. However, with GPS data or manual coordinates, the WCD can display only those cartridges nearest to the player's location. A GPS status icon 348 provides a current status of the GPS signal, including no GPS, acquiring GPS, or GPS acquired. Other types of status are possible. If a GPS signal is acquired, the distance and direction of each cartridge's starting location, in relation to the player's current location, can be displayed.

Figure 30:
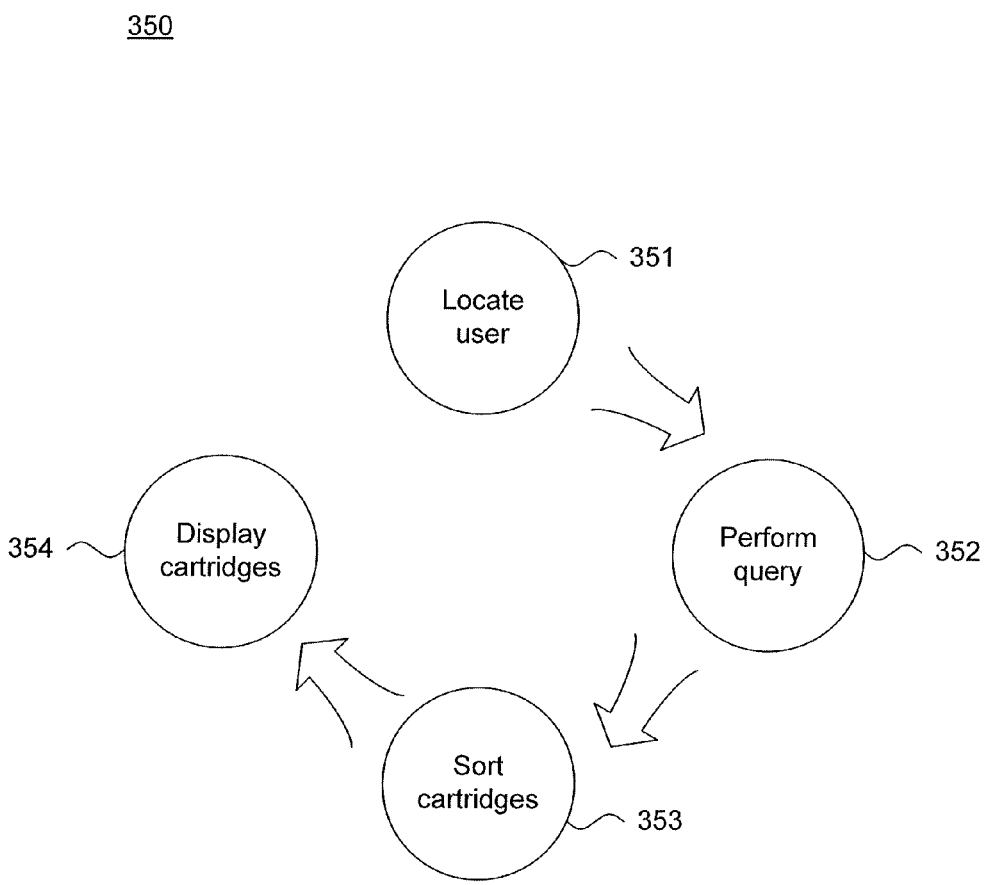
FIG. 30 is a flow diagram showing a routine for obtaining cartridges based on a user request.

A user can obtain desired cartridges by sending a request to the server. FIG. 30 is a flow diagram showing a routine 350 for obtaining cartridges based on a user request. A user location is determined 351 by a WCD, which receives GPS signals via a GPS receiver. The user sends a request for one or more cartridges to the server via the WCD. A database coupled to the server, stores cartridges for access by the user. The request contains a query, which is performed by the server 352. During performance of the query, the server can sort the cartridges 353 to determine those cartridges that satisfy the query. The cartridges that satisfy the query are selected and transmitted to the WCD. The cartridges are displayed as a list for providing to the user 354.

Figure 31:
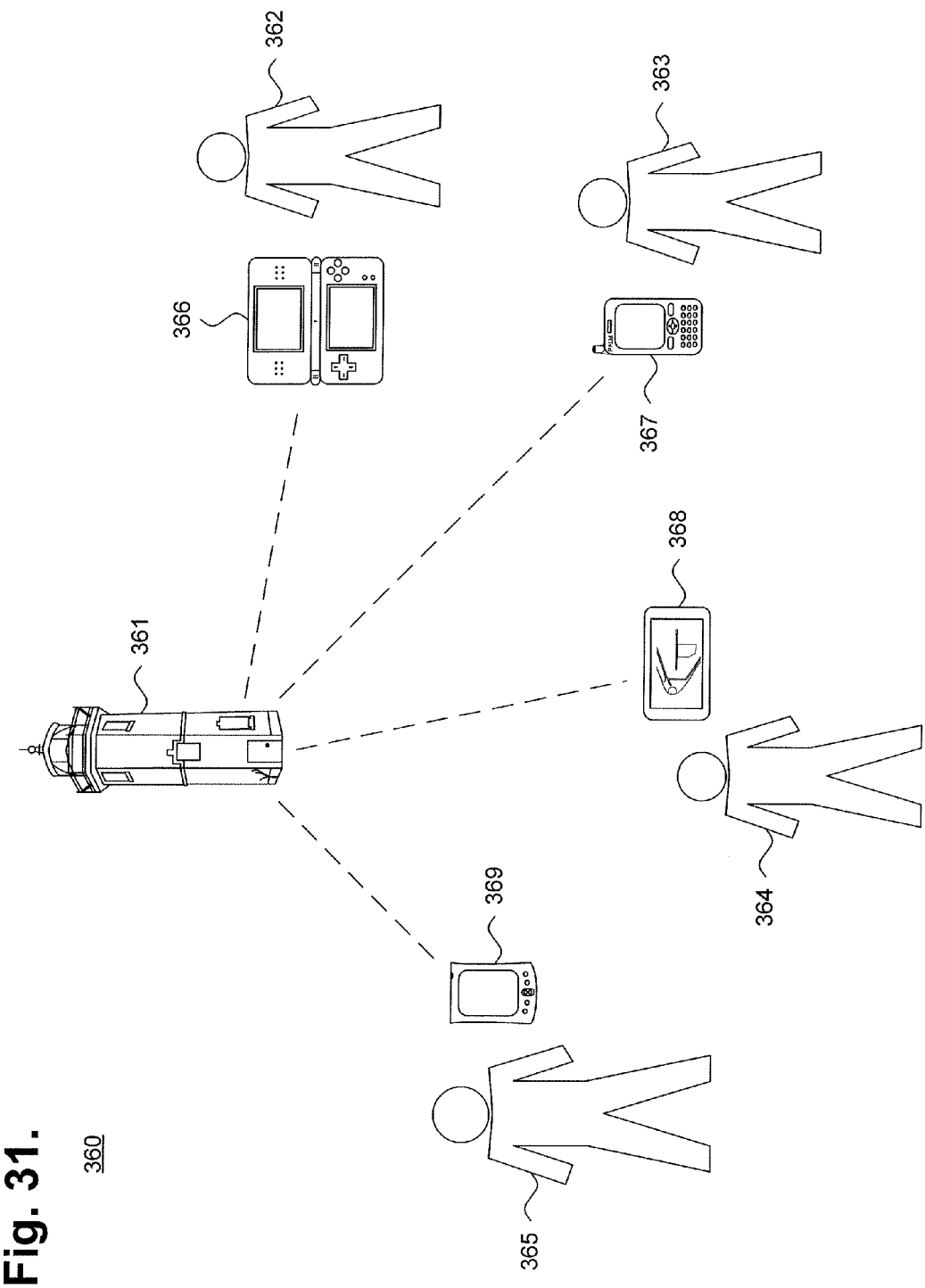
FIG. 31 is a block diagram showing users with different types of wireless computing devices.

Once displayed, the user can select one of the cartridges for executing on the WCD. Different types of devices have different capabilities, set ups, and functionality, which could affect the execution of a cartridge or displays of media associated with the cartridge. Each device can obtain cartridges that are compatible with the type of the device to provide a similar user experience. FIG. 31 is a block diagram 360 showing users 362-365 with different types of WCDs 366-369. A database stores cartridges, which can be executed on one or more WCDs 366-369 to provide a user experience 341. The users 362-365 can have the same user experience despite executing a cartridge on different WCDs 366-369. For example, four users 362-365 with different WCDs 366-369 can share the same user experience on their respective devices. User A 362 has a Nintendo DS 366, User B 363 has a Palm Pilot 367, User C 364 has a GPS device 368, and User D 365 has a Pocket PC 368. The devices 366-369 differ in structure and function. The Nintendo DS 366 can have two screens, whereas, the other devices only have one. Also, the GPS device may not be configured to play sound while the other devices can accommodate sound.

A user can send a request to a server for a particular cartridge. The server obtains device information from the request to determine a type of the requesting WCD. The device information is compared with device characteristics stored in a database, coupled to the server, to ascertain the type of the WCD and the characteristics associated with that type of WCD. The database can also store scripts for cartridges. The scripts include zones of influence, user events, and event media, which are defined by an author for a particular user experience. Also, the cartridge script for a particular user experience can be compiled based on the type of the requesting WCD. Once compiled, the cartridge script is transmitted to the requesting WCD.

Upon receipt, the WCD can execute the cartridge. Returning to our above example, all four users select a cartridge providing a user experience that involves touring the Alki Point Lighthouse in Seattle, Wash. Each user device receives a cartridge containing the Alki Point Lighthouse experience that is specific to the type and functionality of the device. Once executed, the cartridge provides a summary of the user experience, which is displayed on each of the four WCDs. User A 362 has a Nintendo DS 366, which includes two screens. The summary can be displayed on both screens or on one screen. In one embodiment, additional media, such as a landscape image, can be displayed on one screen while a summary is displayed on another screen.

After displaying the summary, each WCD plays the song "Hound Dog" by Elvis Presley. User C 364 has a GPS device 368, which does not have a stereo speaker to play sound media. However, the GPS device 368 does have a piezo beep speaker and can play sound files through a series of beeps that vary in length and tone. Users A 362, B 363, and D 365 hear the words to the song, while User C 314 hears varied beeps that are consistent with the rhythm of the song.

Additional data, such as user data and advertisements can also be compiled with the cartridge script for a cartridge. The user data can include information specific to a user, such as a user identification number, when the cartridge was downloaded by the user, the version of the cartridge, and user preferences. The user data is embedded in the player experience particular to the cartridge. Other user data is possible.

The advertisements can also be included in the user experience. For instance, a company wishing to advertise their goods or services can subscribe to an advertising feature. During the user experience, the company's advertisements will be displayed to the user. The advertisements can be selected based on a user's preference or a user's history. Other methods for selecting the advertisements are possible. A timed expiration date can be applied to each advertisement to control a length and number of times the advertisement is displayed. Other advertisement features are possible.

Once compiled, the selected cartridge can be executed by the WCD. During execution of the cartridge, the user's WCD collects event related data, which can be stored. Upon completion or termination of the cartridge, the user can voluntarily decide whether he would like to send the event related data to the server as play feedback for that cartridge. If sent, an authorized user, such as the author can access the play feedback related to the user and the cartridge via the client or the WCD. Other authorized users are possible. Access to the play feedback can be restricted based on a author identification, which can be the same as or different from the author verification for accessing cartridges.

Figure 32:
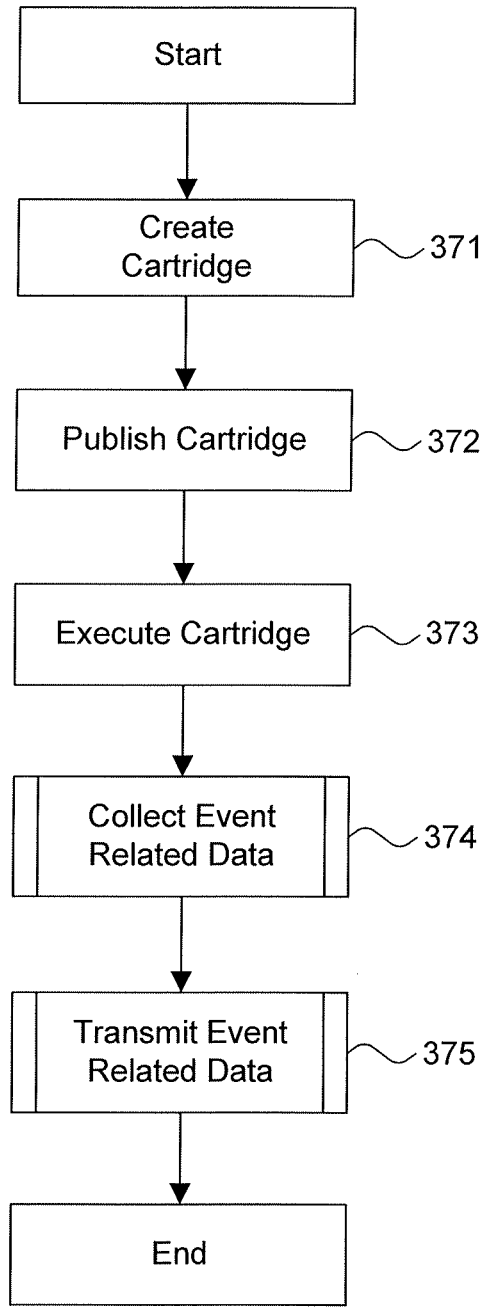
FIG. 32 is a flow diagram showing a routing for providing play feedback to an author.

The play feedback can provide an author with a quantitative assessment of the cartridge based on a particular user's experience. The play feedback can also assist the author in determining stages, locations, or events with which the user experienced difficulty in completing. FIG. 32 is a flow diagram showing a routine 370 for providing play feedback to an author or another authorized user. The author creates a cartridge (block 371) by defining zones of influence and user events, as described above with reference to FIGS. 20-26, which are compiled into scripts. Once created, the cartridge can be published (block 372) for public access. In one embodiment, the cartridge can be subject to review by a publication review board prior to publication. If the cartridge is not accepted, the author can revise the cartridge script according to recommendations of the review board. However, if accepted, the cartridge can be published for execution by other users.

A user can select a published cartridge from a database for executing (block 373) on his WCD. During execution, the WCD can collect event related data (block 374) specific to that cartridge, as further described below with reference to FIG. 33. Upon completion or termination of the cartridge or at any other time, if desired, the user can choose to transmit the event related data to a server (block 375) as play feedback, as further described below with reference to FIG. 34.

Figure 33:
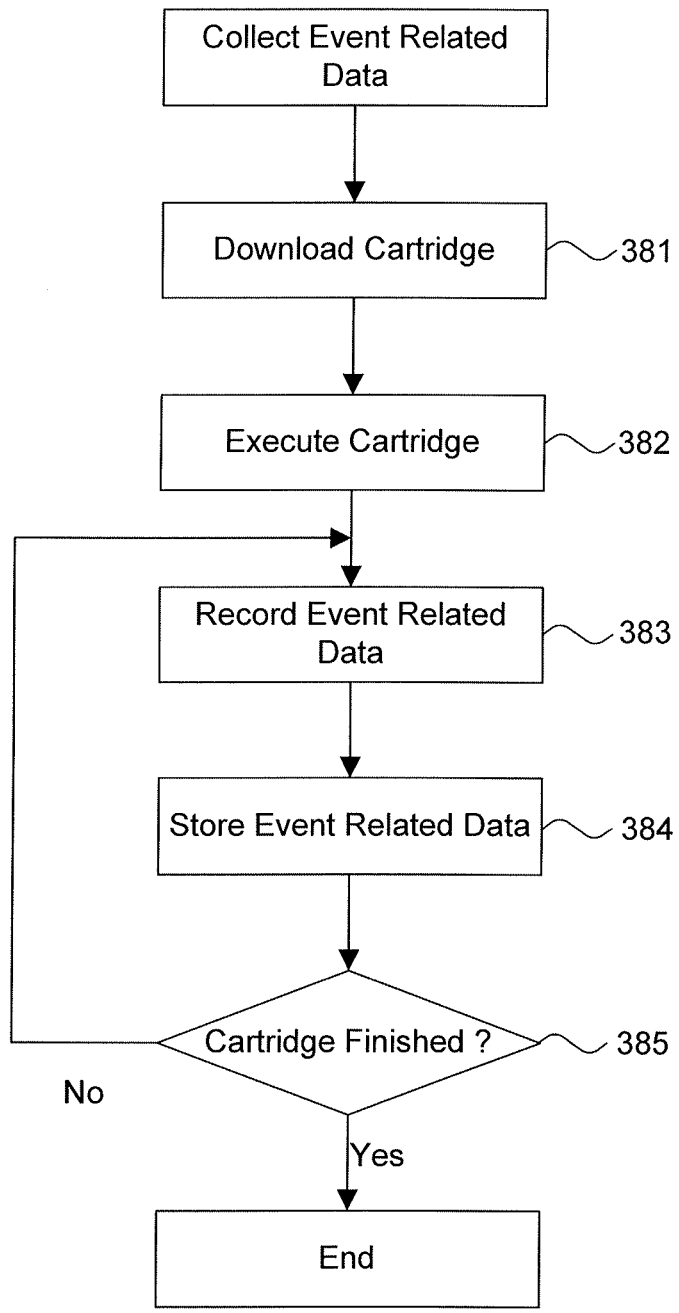
FIG. 33 is a flow diagram showing a routine for collecting event related data for use in the routine of FIG. 32.

FIG. 33 is a flow diagram showing a routine 380 for collecting event related data for use in the routine of FIG. 32. A user can review and select a cartridge for downloading on his WCD (block 381). The WCD can display the cartridge in a menu, which can include all cartridges previously downloaded by the user. In one embodiment, the menu can include only those cartridges nearest to a user's location, as determined by a GPS receiver in the WCD, or by other data source.

For example, a user is located on Beacon Hill in Seattle and requests a list of available cartridges. Based on the user's location, two cartridges are displayed in the menu on the WCD, both of which were previously downloaded by the user. The cartridges include "Famous Franklin Quakers," which provides a user experience related to famous people who attended Franklin High School, and "Jackson Golf Course," which describes a user experience related to golf, as described above with reference to FIG. 7. The user selects the "Jackson Golf Course" cartridge.

Once selected, the cartridge can be executed (block 382) on the WCD, as described above with reference to FIGS. 10-15. Cartridge data, including a summary and object of the cartridge, is displayed. Returning to our previous example, the "Jackson Golf Course" cartridge provides a summary describing the plot and object of the user experience. A player character is a top contender in an important golf tournament. However, prior to the tournament, a rival competitor steals the player character's lucky golf charm. The object of the cartridge is for the player character to locate his stolen charm prior to commencement of the tournament, which begins in two hours.

The user of the WCD assumes the role of the player character and enters the Jackson Golf Course in a golf course zone 81. As used hereinafter, the terms "user" and "player character" will interchangeably refer to a person executing the cartridge and assuming the role of the player character. Upon entry of the golf course zone 81, the user can begin his search for the missing lucky charm based on the defined zones of influence, user events, and other information provided by the cartridge script. The user's location is continuously determined by a GPS receiver in the WCD, or by other data source. When the user's location corresponds to geolocational data stored in the script for a zone of influence, a user event associated with that zone of influence is triggered. The user events can also be trigged by temporal and independent conditions. For instance, a user event can be triggered by a temporal condition, which is based on timed events, such as reaching a particular destination in a predetermined amount of time. The user events can also be triggered when independent conditions are satisfied, such as by the occurrence of user-initiated, player character, or non-player character actions.

In the above golf course example, the player character moves within the golf course zone 81 towards a base zone 82. Upon entry into the base zone 82, an associated user event is triggered, which provides a clue to assist the player character in identifying the rival competitor who stole his lucky charm. The clue notifies the player character that a large right-handed golf glove has been located, as provided by a display on the WCD. The player character is instructed to pick up the glove, which was mistakenly dropped by the rival player.

The WCD records event related data (block 383) when a user event is triggered. The event related data can include a location of the user at the time of the event, a time at which the user entered the location, and completion of the event. A time stamp of the event related data can be recorded for each event triggered. Other types of event related data, methods for recording the data, and times for recording the data are possible. The recorded event related data is stored (block 384) on the WCD by gathering the time stamps for each event into a text file associated with the cartridge. When the user terminates execution of the cartridge (block 385) by completing the cartridge or by manually terminating the cartridge, the routine ends. However, if cartridge execution has not terminated, the WCD continues to collect event related data (block 383) until termination. Other methods and types of files for storing the event related data are possible.

Returning to the above golf course example, a user event is triggered when the player enters the base zone 82. The instructions associated with the user event appears on the display of the WCD and instructs the user to pick up the right hand golf glove of the rival player who stole his lucky charm. As the player character picks up the glove, the WCD collects and stores the event related data associated with the user event of picking up the glove. The event related data includes the location at which the user entered the base zone, the time at which the user entered the zone, and whether the user picked up the glove.

Figure 34:
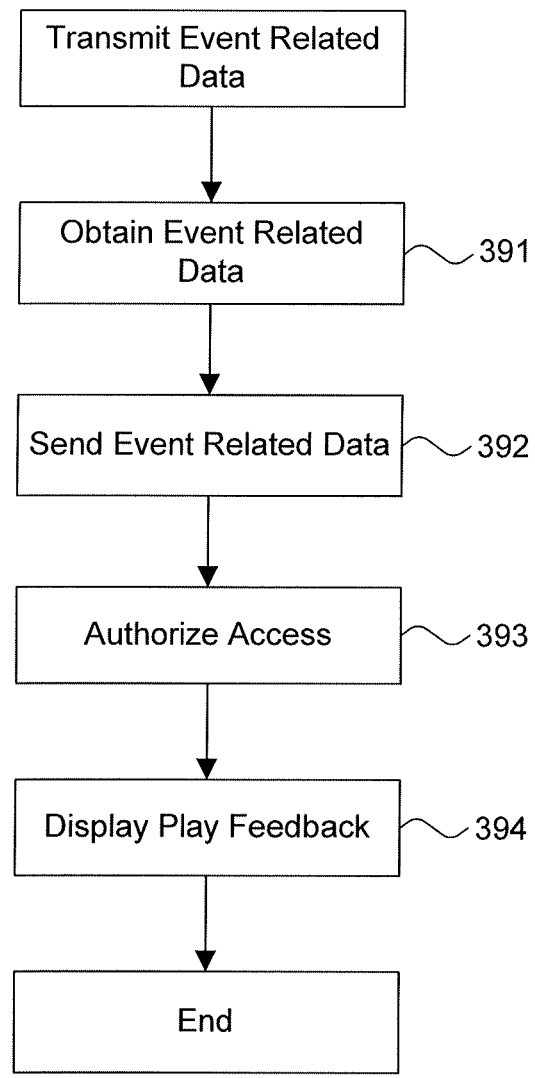
FIG. 34 is a flow diagram showing a routine for transmitting feedback to a server for use in the routine of FIG. 32.

The user can transmit the stored event related data to an author of the cartridge for use as a quantitative evaluation. FIG. 34 is a flow diagram showing a routine 390 for transmitting feedback to a server for use in the routine of FIG. 32. A WCD executes a cartridge selected by a user. During execution, event related data is obtained (block 391) and stored by the WCD. After cartridge termination, the user can send the event related data (block 392) to the centralized server, as play feedback. The event related data remains stored on the WCD, if the data is not sent. If the user subsequently executes the same cartridge, the additional event related data collected can be stored with the previous event related data. The timestamps for the additional event related data will be added to the text file with the previous timestamps when the previous event related data is stored on the WCD. When the previous event related data is stored on the server, a new text file will be created for the additional timestamps and transmitted to the server for combining with the previous text file. The sending of the event related data can be optional for the user. Incentives, such as points, certificates, and awards, can be provided to promote sending of the data. Other methods for storing and transmitting the event related data are possible.

Upon receipt by the server, the event related data is stored in a database coupled to the server. Access to the user event data can be restricted based on a user type, subscription, or participation. Other access restrictions are possible. In one embodiment, only the author of a cartridge is able to receive play feedback specific to a cartridge. The authors are identified and authorized (block 393) based on a password or author identification number, which can be the same as or different from the author access codes of the cartridges. Once authorized, the play feedback can be provided as a display (block 394) on the author's client or WCD.

The play feedback can be displayed on a map of the zones of influences defined for the particular cartridge. For instance, the map could include each golf zone, the time required for a user to get from one zone to the next, whether an event was completed, and the route of the user. Other play feedback and displays of the feedback are possible. The author can use the play feedback data to revise the cartridge and to create other cartridges, as well as other uses.

Returning to the above golf course example, the player character has located and picked up the rival's right hand glove, which is displayed by the WCD. The WCD collects the data associated with the event of picking up the glove. The player continues to gather clues by triggering user events. The clues include locating a piece of red cotton material and a matchbook from a restaurant in Niagara Falls, N.Y. Based on the clues, the player character determines that John Johnson, a rival in the golf competition, stole his lucky charm. John Johnson is right handed, wears red cotton tee shirts for every golf tournament, and is from Buffalo, N.Y. After identifying the rival player, the player character recovers his lucky charm, which is located in John Johnson's hotel room, prior to the golf tournament. Upon successful completion, the user sends the event related data to the server for display to an authorized user.

The author of the "Jackson Golf Course" cartridge provides the requested authentication information to access the data. Once authenticated, the author is notified that two other users have completed the golf course cartridge. After reviewing the data sent by each of the users, the author determines that the cartridge is too easy since each of the users completed the events in half the time previously estimated by the author. The author can use the feedback to revise the cartridge or to create other cartridges. Additionally, the author can use the data to review each action recorded for the cartridge and compare the data against the corresponding cartridge script to identify the locations, events, and times at which a user was unable to proceed. In one embodiment, each user can also provide user feedback regarding the cartridge executed. The user feedback can include information, such as whether the user enjoyed the experience, difficulties in the experience, suggestions, and recommendations.

In one embodiment, the cartridges can be provided to a user as a series, which together provide a user experience. Once a user has successfully completed a cartridge, the completion data can be sent to the server in a manner similar to the event related data. Upon receipt, the server reviews the completion data. If the completion data is correct, the server provides the user with a cartridge that provides a next stage of the user experience. Each stage in the series is provided to the user based on a completion status of the previous cartridge. The user information and credentials are transmitted with the completion data.

In a further embodiment, a user can provide payment information, which is stored on a central server. The payment information can include available credit or a credit card transaction. Other types of payment information are possible. The credit can be used to pay for cartridges selected by the user. Once the user selects a cartridge for executing on his WCD, the user's payment information can be authorized. If successful, the user can download and execute the cartridge.

Although the examples provided above are described in relation to a WCD, other devices, including wired devices can be used.

While the invention has been particularly shown and described as referenced to the embodiments thereof, those skilled in the art will understand that the foregoing and other changes in form and detail may be made therein without departing from the spirit and scope of the invention.

APPENDIX

```
<cartridge version ="0.1b" company="Groundspeak" name="Generic Golf Course">
    (...Define Global zone properties)
    <zones>
        <zone id=200 layer="+3">
            <name>Hole 18: Green (Radial Zone Example)</name>
            <description>You're on the Green!</description>
            <shape="radial" dimension=2 measurement="km">.015</shape>
            <vectors datum= "WGS84">
                <point id=1 lat=47.655 lon=-122.001 altitutde=300>
            </vectors>
            <on_enter>
                <trigger_event desc="Entering Hole 18 Green">64</trigger_event>
                <pc_set attribute="position" recurring=true>Entered the Green</pc set>
                <set_score recurring=false>+20</set_score>
            </on_enter>
            <on_exit>
                <trigger_event desc="Leaving Hole 18 Green">123</trigger_event>
                <pc_set attribute= "position" recurring=true>Left the Green</pc_set>
            </on_exit>
            <proximity measurement="m" distance=5 desc="Close to the Green">
                <trigger_event >222</trigger event>
            </proximity>
        </zone>
        <zone id=200 layer="+3">
            <name>Hole 18: Sand Trap (Vector Zone Example)</name>
            <description>You are in the sand trap. Good luck!</description>
            <shape="vector" dimension=2 />
            <vectors datum= "WGS84">
                <point id=1 lat=47.XXX lon=-122.XXX/>
                <point id=2 lat=47.XXX lon=-122.XXX/>
                ...
                </point id=450 lat=47.XXX lon=-122.XXX/>
            </vectors>
            <on_enter>
                <trigger_event desc="Entering Hole 18 Sand Trap">164</trigger_event>
                <pc_set_attribute="position" recurring=true>In the Sand Trap</pc_set>
                <set_score recurring=true>-5</set score>
            </on_enter>
            <on_exit>
                <trigger_event desc="Leaving Hole 18 Green>123</trigger_event>
                <pc_set attribute="position" recurring=true>Outside Sand Trap</pc_set>
            </on_exit>
            <proximity measurement="m" distance=5 desc="Danger! Near Sand Trap">
                <trigger_event>232</trigger event>
            </proximity>
        </zone>
    <items>
        <item id=12>
        <short_name>a Golf Ball<short_name>
        >long_name>a brand new golf ball</long_name>
        <description>It looks like your typical golf ball</description>
        <action_command="crush">
            <destroy_item id=12/>
        </action>
```

APPENDIX-continued

```
        </item>
    </items>
    <npcs>
        <npc id=32>
            <short_name>Charles the Caddy<short_name>
            <action command="recommend">
                ...trigger some action
            </action>
            <topics>
                <topic name="Golf">
                    <topic />
                </topic>
            <topics>
            </npc>
    </npcs>
    <events>
        <event id=64 type="execute/recurringItime">
            <conditions>
                </triggers>
            </conditions>
            <triggers>
                <set_attributes />
                <play_media/>
            </triggers>
        </event>
    </events>
    <initialization>
        <create_zone id=200/>
        <create_item id=12 lat=47.675 lon=-122.123/>
        <create_npc id=32 lat=47.678 lon=-122.234/>
        <set_score>0</set_score>
    </initialization>
</cartridge>
```

What is claimed is:

1. A system for conducting a location based search for event cartridges, comprising:
   a database of cartridges each comprising a sequence of events related to a common theme, and geolocational data for a start location for execution of the sequence of events in that cartridge, wherein the common theme is selected by an author of the cartridge; and
   a server operatively coupled to the database and interfaced to a user device having a display and user input controls, comprising:
      a web server receiving a user request comprising a location of the user device;
      a database manager searching the cartridges by comparing the location of the user device and the start location for execution of the sequence of events for each cartridge, selecting those cartridges with the start location proximate to the location of the user device, providing the selected cartridges to the user device as a menu on the display, receiving a cartridge request for one of the selected cartridges from the user device, determining a type of the user device, compiling a script for the sequence of events of the one selected cartridge based on the type of the user device, and transmitting the compiled script for the one such selected cartridge to the user device;
      a processor to execute the web server; and
      a further processor to execute the database manager.

2. A system according to claim 1, wherein the cartridges are selected by receiving a specified distance from the location of the user device in the user request, by comparing the specified distance with the start location for each cartridge, and by choosing the cartridges having the start location within the specified distance from the location of the user device.

3. A system according to claim 1, wherein user data is compiled with the script and the user data comprises at least one of user identification data, a location of the cartridge request, a version of the one such selected cartridge, and user preferences.

4. A system according to claim 1, wherein at least one of a cartridge request to download one of the selected cartridges for execution by the user device is received, play feedback for one or more of the events following execution of the one such selected cartridge by the user is received device, and the play feedback is provided to one or more users.

5. A system according to claim 4, wherein the play feedback comprises one or more of the location of the user device at one of the events, a time at which one of the users entered the location of the user device, and a status of the one such event.

6. A system according to claim 4, wherein access to the play feedback is restricted based on identification of the users.

7. A system according to claim 1, wherein the location of the user device comprises at least one of a geospatial boundary, address, landmark, and geospatial coordinates.

8. A system according to claim 1, wherein the user device displays the selected cartridges by providing at least one of a title, activity identifier, icon, and player status for each selected cartridge in the display.

9. A system according to claim 1, wherein a series of the cartridges is provided to the user device, the user request is received from the user device with a completion status of a previously executed cartridge in the series, and a following cartridge in the series is transmitted to the user device.

10. A system according to claim 1, wherein the user request is authenticated by one of a password, user identification number, and login and the user request is processed upon successful authentication.

11. A system according to claim 1, wherein payment information from a user is obtained and a payment for one or more of the selected cartridges is processed using the payment information.

12. A method for conducting a location based search for event cartridges, comprising:
   maintaining a database of cartridges each comprising a sequence of events related to a common theme, and geolocational data for a start location for execution of the sequence of events in that cartridge, wherein the common theme is selected by an author of the cartridge;
   interfacing a server operatively coupled to the database to a user device having a display and user input controls;
   processing a user request from the user device, comprising:
      receiving the user request comprising a location of the user device;
      searching the cartridges by comparing the location of the user device and the start location for execution of the sequence of events for each cartridge;
      selecting those cartridges with the start location proximate to the location of the user device; and
      providing the selected cartridges to the user device as a menu on the display, wherein the selected cartridges are further selectable through the user input controls;
   receiving a cartridge request for one of the selected cartridges from the user device;
   determining a type of the user device and compiling a script for the sequence of events of the one such selected cartridge based on the type of the user device; and
   transmitting the compiled script for the one such selected cartridge to the user device.

13. A method according to claim 12, wherein the cartridges are selected by:
   receiving a geolocational boundary for the start location of the cartridges in the user request;

determining a distance between the location of the user device and the start location for each cartridge;

sorting the cartridges by the distance; and choosing the cartridges having the distance within the geolocational boundary.

14. A method according to claim 12, further comprising:

compiling user data with the script, wherein the user data comprises at least one of user identification data, a location of the cartridge request, a version of the one such selected cartridge, and user preferences.

15. A method according to claim 12, further comprising:

receiving a cartridge request to download one of the selected cartridges for execution on the user device;

receiving play feedback for one or more of the events following the execution of the one such selected cartridge by the user device; and providing the play feedback to one or more users.

16. A method according to claim 15, wherein the play feedback comprises one or more of the location of the user device at one of the events, a time at which one of the users entered the location of the user device, and a status of the one such event.

17. A method according to claim 15, further comprising:

restricting access to the play feedback based on identification of the users.

18. A method according to claim 12, wherein the location of the user device comprises at least one of a geospatial boundary, address, landmark, and geospatial coordinates.

19. A method according to claim 12, wherein the user device displays the selected cartridges by providing at least one of a title, activity identifier, icon, and player status for each selected cartridge in the display.

20. A method according to claim 12, further comprising:

providing a series of the cartridges to the user device, comprising:

receiving the user request from the user device with a completion status of a previously executed cartridge in the series; and transmitting a following cartridge in the series to the user device.

21. A method according to claim 12, further comprising:

authenticating the user request by one of a password, user identification number, and login; and processing the user request upon successful authentication.

22. A method according to claim 12, further comprising:

obtaining payment information from a user; and processing a payment for one or more of the selected cartridges using the payment information.

* * * * *